United States Patent
Savage et al.

(10) Patent No.: US 6,604,110 B1
(45) Date of Patent: Aug. 5, 2003

(54) AUTOMATED SOFTWARE CODE GENERATION FROM A METADATA-BASED REPOSITORY

(75) Inventors: William H. Savage, Durham, NC (US); William F. Cowan, Raleigh, NC (US); Robert J. Geiger, Jr., Cary, NC (US); Gregory D. Leman, Durham, NC (US)

(73) Assignee: Ascential Software, Inc., Westboro, MA (US)

( * ) Notice: Subject to any disclaimer, the term of this patent is extended or adjusted under 35 U.S.C. 154(b) by 295 days.

(21) Appl. No.: 09/703,161

(22) Filed: Oct. 31, 2000

Related U.S. Application Data

(63) Continuation-in-part of application No. 09/651,933, filed on Aug. 31, 2000.

(51) Int. Cl.[7] .............................................. G06F 17/30
(52) U.S. Cl. ....................................................... 707/102
(58) Field of Search .......................... 707/1, 2, 10, 101, 707/102, 103 R, 104.1, 200; 705/10

(56) References Cited

U.S. PATENT DOCUMENTS 6,212,524 B1 * 4/2001 Weissman et al. ........... 707/101
6,418,450 B2 * 7/2002 Daudenarde ................. 707/10

OTHER PUBLICATIONS

Critchlow et al., Meta–Data Based Mediator Generation, 1998 IEEE, pp. 168–175.*

* cited by examiner

*Primary Examiner*—Diane D. Mizrahi
*Assistant Examiner*—Apu Mofiz
(74) *Attorney, Agent, or Firm*—Wolf, Greenfield & Sacks, P.C.

(57) ABSTRACT

Software code for execution in an EDM application in presenting data from one or more data sources to an EDM application user, is generated from the source metadata obtained by analysis of the data sources in accordance with the structural entities of a generic data repository.

22 Claims, 19 Drawing Sheets

AUTOMATED SOFTWARE CODE GENERATION FROM A METADATA-BASED REPOSITORY

CROSS REFERENCE TO RELATED PATENT APPLICATIONS

This is a continuation-in-part (CIP) application of a commonly owned, co-pending and pending, U.S. patent application entitled: Metadata-Based Repository for Automated Analysis of Source Data, Ser. No. 09/651,933, filed on Aug. 31, 2000 by William H. Savage et. al, which discloses information disclosed and claimed in this application.

TECHNICAL FIELD

This invention relates to the field of enterprise data management (EDM) applications, and more particularly to the transformation of operational system databases for use in EDM applications.

BACKGROUND ART

Enterprise data management (EDM) is the process of sharing data across an organization and making information available to decision makers, regardless of the source of the data. The field has grown rapidly as businesses have discovered the return on investment possible from making decisions based on enterprise-wide data resources. Increasingly, organizations are analyzing current and historical data to identify useful patterns, and to support business strategies. EDM applications include: E-commerce internet portals, customer relationship management (CRM), enterprise resource planning (ERP), business intelligence (BI), and data warehousing.

Data warehousing is representative of the characteristics of each of these EDM applications, which extract operational data of an enterprise from the enterprise operational data systems and collects it in a multi-dimensional database. The multi-dimensional database supports on-line analytical processing (OLAP) to analyze groups of records that share a common field value, in contrast to on-line transaction processing (OLTP) which accesses individual records in the operational data system relational database. In effect, OLAP extracts business intelligence while OLTP extracts data.

To permit multi-dimensional analysis, the EDM application data must be separated from the operational systems, and the required operational system data must be transferred into the EDM application. All of the transferred operational source data must be logically transformed from the operational system model to the logical and physical structure of the data warehouse, which aligns with the business structure. As an example, a data warehouse may combine data from different source applications such as sales, marketing, finance, and production, thereby giving it the ability to cross-reference data from these applications. This transfer and transformation of the data between system models is referred to as "data migration".

Assuming that the data model (i.e., the logic and structure) of the particular EDM application is known, the major step in data migration is the transformation of the source data, which is necessary to make it independent of the relational data model of the operational systems as well as have it fit into the EDM data model. Attributes of the source data that are essential to the operational system may be unnecessary for the particular EDM application, and are not loaded into the warehouse. This step typically involves "data cleansing" or "data staging" processes which are labor intensive and tedious in a data warehousing project. This transformation involves the major steps of reverse engineering the source data, its form, and its database structures to determine its metadata, adapting the source data to fit the data structure of the EDM application, and loading the transformed source data to the EDM target database.

In varying degrees, this requires the EDM application developer to: (i) analyze the source databases to identify the type and form of the source data and the structure and operational system of the source databases, to determine their relevance to the EDM target database; (ii) load the source data from the legacy databases to an intermediate database using extract, transform, and load (ETL) software tools or hand-coded programs; (iii) massage, cleanse, and manipulate ("transform") the source data in the intermediate database into the form needed for the EDM application; and (iv) load the transformed source data into the EDM application, and format it in those schemas necessary for OLAP or other EDM applications.

In the prior art, these steps are performed manually, by a team of developers, including those of ordinary skill in the art of software programming. While there are now ETL software tools that automate the process of extracting and transforming data from the source database to the EDM application, these ETLTools recognize and rely on the source metadata (the source data structure) available from the source database management system (DBMS) to generate the EDM application code. However, the program developer can only determine the source metadata through the source data DBMS documentation (if available), interviews with the customer (if they have the knowledge), and a lengthy and laborious trial and error process.

The above cross-referenced patent application discloses and claims method and apparatus for automating the analysis of a data source. It does this by establishing a data repository having an entity structure which defines the metadata characteristics of a generic model data source. The data repository may be configured to reflect the construct of any given data source. Once configured, the source database may then be automatically analyzed in an elemental sequence defined by the repository's entity structure to provide a comprehensive metadata model of the source data. This set of metadata may then be used directly to generate program code for a plurality of different EDM applications; each with different database models and operating systems.

DISCLOSURE OF INVENTION

One object of the present invention is to provide method and apparatus for acquiring the metadata of a source database in a manner which allows the acquired metadata to be used to generate diverse type EDM applications. A further object of the present invention is to create an architecture for a data repository which defines the metadata characteristics of a generic model data source in a manner which permits program code for EDM applications to be generated directly from the acquired metadata. A still further object of the present invention is to provide method and apparatus for generating such EDM program code for different database models and for different EDM operating systems.

According to the present invention, a method of obtaining the metadata of a data source comprises the steps of creating a data repository having an entity structure which defines the metadata characteristics of a generic model data source, accessing the data source to determine its construct, configuring the data repository entities to reflect the construct of the data source, and analyzing the data source in response to the configured data repository entities to obtain the source metadata. According to another aspect of the present invention, the step of analyzing the data source to determine its metadata includes the steps of obtaining those elements of source data which correspond to the metadata attributes of the configured data repository entities, and recording the obtained elements of source data in the data repository, each in association with their corresponding metadata attribute. In further accord with this aspect of the invention, the step of analyzing further includes the steps of inferring selected aspects of the data source structure on the basis of the recorded elements of source data, and recording those inferred data source aspects in the data repository for review by an operator, who may either accept or modify one or all of the inferences.

The present invention automates the process of building an EDM system application, and, in its best mode, the method is embodied as a software application. It employs an exhaustive reverse engineering process to analyze the source data and acquire a comprehensive set of source metadata. The invention then uses this information to build a model of the data. As part of the analysis process, the invention provides recommendations for the target EDM application database, such as primary keys, foreign keys, table splits, normalization, dimensions, measures, and views of the data. The result is an optimal target database for the EDM application.

The present invention allows users to migrate multiple disparate systems by providing a complete understanding of the metadata and generating the ETL programs to merge the data. Since the code is automatically generated, the speed of implementation is dramatically increased. Because the metadata is based on the actual source data, it is of the highest degree of accuracy.

These and other objects, features, and advantages of the present invention will become more apparent in light of the following detailed description of a best mode embodiment thereof, as illustrated in the accompanying Drawing.

BEST MODE FOR CARRYING OUT THE INVENTION

The present invention is to a method and apparatus for analyzing the relations, attributes, and rows or records of data stored within a source database to determine its metadata. It analyzes the source database in an elemental sequence that is defined by the logical and structural model of a data repository having defined entity relationships, so as to provide a comprehensive metadata model of the source data. The detailed information provided by this metadata model is sufficient to provide a generic description of the source data that can be used to generate program code for a plurality of enterprise data management (EDM) applications with different database models and operating systems.

As defined in detail hereinafter, a central feature of the present invention is the ordered sequence and elemental detail of the analysis performed on the source data. This analytic discipline is governed by demand of the data repository model, which functions as a checklist for the metadata details required. This structured approach ensures both a comprehensive analysis and a consistency between the analysis performed on each source database, to provide the highest degree of accuracy in results. While the same comprehensive analysis, consistency, and accuracy can be achieved by using this structured approach manually, in its best mode, the invention is embodied in software. The software embodiment may be provided in any of a variety of known program languages for use in any of a variety of applications, using any of a number of known signal processing devices and operating system protocols.

Figure 1:
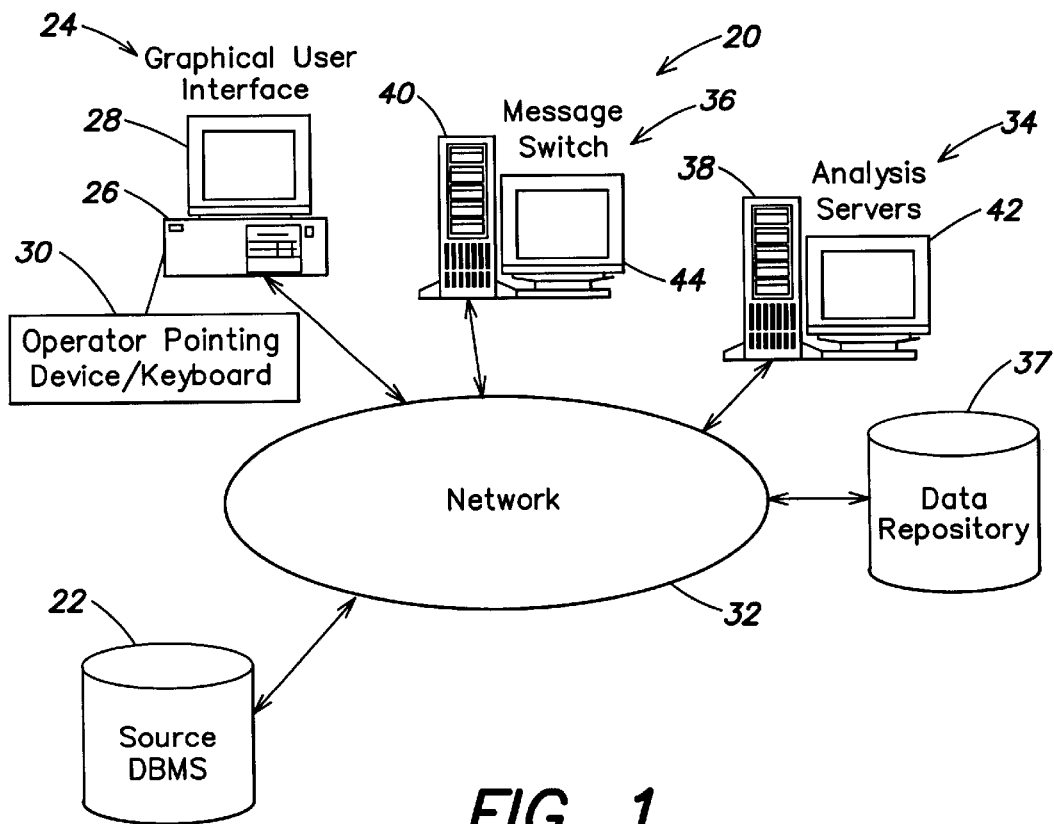
FIG. 1 is a figurative system diagram of one embodiment in which the present invention may be used.

FIG. 1 is a schematic illustration of a best mode embodiment 20 of the invention in a network-based, client/server application, for use in analyzing the data stored in a source database 22. The network may be a local or wide area network with connectivity to the necessary file and database servers. However, it should be understood that the FIG. 1 embodiment is only one of several alternative embodiments that may be used to provide connectivity. The invention is not limited to use in a network and, as known to those skilled in the art, any of a number of alternative methods and configurations may be used to connect the client/server to the source database 22. Similarly, the analyzed source database 22 may have any type data construct, with any type source database management system (DBMS) software to manage data access. For ease of reference, the source database and associated DBMS are here designated as the source DBMS 22.

As described previously, in its software embodiment, the invention performs the automated analysis of the characteristics of the source DBMS 22 to determine its construct, form, and operating system characteristics to a degree which permits the invention to make inferences regarding the characteristics of individual data entries as well as their column and table construct within the source database. This analysis is performed in a sequence of defined steps; each step being associated with a different phase of the analysis construct. At the conclusion of each phase the invention makes inferences regarding the source data construct. The inferences are dependent on the analysis results, and are stored with the analysis results within the data repository 37. Succeeding phases are also, to a degree, dependent on the inferences made in the preceding phase. In the best mode embodiment, the invention provides the human operator, such as the EDM application developer, the opportunity to review the inferences made and either accept or modify them before proceeding to the next phase.

In the best mode embodiment, the human operator is given access to the method through a graphic user interface (GUI) 24, comprising a known type signal processor 26, a GUI display 28, and an operator pointer/command entry device 30 (e.g., keyboard, mouse). Depending on the size of a given EDM project, there may be several GUI interfaces for team use. The GUI 24 is connected through its processor's communication port and the network 32 to one or more application servers, such as the analysis servers 34. Since the operational steps of the present method are machine-time dependent, the analysis may be performed on multiple analysis servers if desired. However, only one analysis server is shown in FIG. 1 for simplicity of illustration.

The analysis servers 34 communicate with the GUI 24 through a messaging server 36, which functions as a message handler in facilitating communication exchanges between all components of the method's embodiment. In the illustrated embodiment, the analysis servers 34 perform analysis of the source DBMS 22 and store the results of each analysis in a data repository 37, which is a known type, non-volatile signal storage medium. The analysis results stored in the data repository 37 are then displayed to the operator through the GUI 24.

Figure 2:
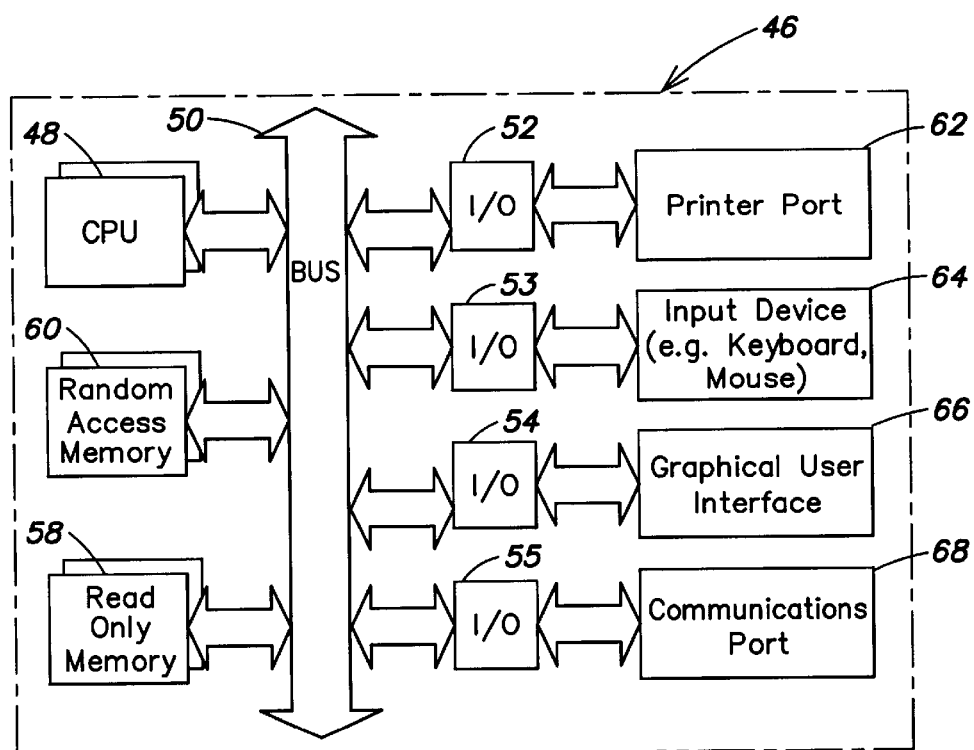
FIG. 2 is a schematic block diagram of one element of the embodiment of FIG. 1.

The servers 34, 36 each include a known type signal processor 38, 40 and optional viewable display 42, 44. The signal processors 26, 38 and 40 for the GUI 24, the analysis servers 34, and the message server 36, are each of a known type, which embody a central processing unit (CPU) architecture of the type shown in simplified form in FIG. 2 by the signal processor 46. Referring to FIG. 2, the signal processor 46 includes one or more CPUs 48 connected through a universal signal bus (USB) 50 to a plurality of input/output (I/O) devices 52–55, and to signal storage devices, such as one or more non-volatile read-only memory (ROM) devices 58, and one or more volatile random access signal memory (RAM) devices 60. The I/O devices 52–55, respectively, connect the USB 50 to the signal processor's printer port 62, the operator input device 64 (e.g., keyboard, mouse), the viewable display 66, and the processor's communications port 68.

Although the data repository 37 is shown as a separate signal storage device in the best mode embodiment of FIG. 1, it should be understood that the data repository may alternatively reside in the signal memories resident in any one or several of the signal processors which are used to execute the method. In other words, the user may elect the location of the data repository as deemed suitable for a given application. Similarly, as may be more easily understood following the detailed description below, the structure of the data repository may be implemented in several segments, each in different storage devices, as deemed suitable by those skilled in the art.

In the best mode embodiment, the GUI 24 and analysis servers 34 operate in a client-server protocol. Different files of the software program embodying the invention are loaded into the memories of both. The files associated with the interactive display are installed in the GUI signal processor 26 and those associated with the data analysis functions are installed in the signal processor 38 of the analysis servers 34. The files installed in the analysis server include an application program interface (API) to provide for server access to the source DBMS 22. The API may of any known type. In a best mode embodiment the software includes an Open Database Connectivity (ODBC) application programming interface developed by Microsoft® Corporation.[1]

[1]Microsoft is a registered trademark of the Microsoft Corporation.

As known, the ODBC application defines a low-level set of calls which allow the client application running on the analysis servers 34 to exchange instructions and share data with the source DBMS 22, without the two having to know anything about each other. It does this by inserting a "database driver" middle layer between the application and the DBMS software. The driver translates the application data queries into commands that the DBMS understands.

Prior to the actual analysis of the source DBMS, the developer/operator will obtain access (logon) information for the source DBMS 22, such as an assigned user identification (ID) and password which allows the operator to log into the source DBMS 22 from the GUI. The analysis servers 34 initiate contact with the DBMS of the source DBMS 22 on command of the operator from the GUI 24. The server 34 communicates with the source DBMS 22 using a structured query language (SQL) format and the ODBC library of function calls. The analysis server uses the "catalog" and "retrieval" function calls to have the source DBMS 22 download the available source metadata.

Figure 3:
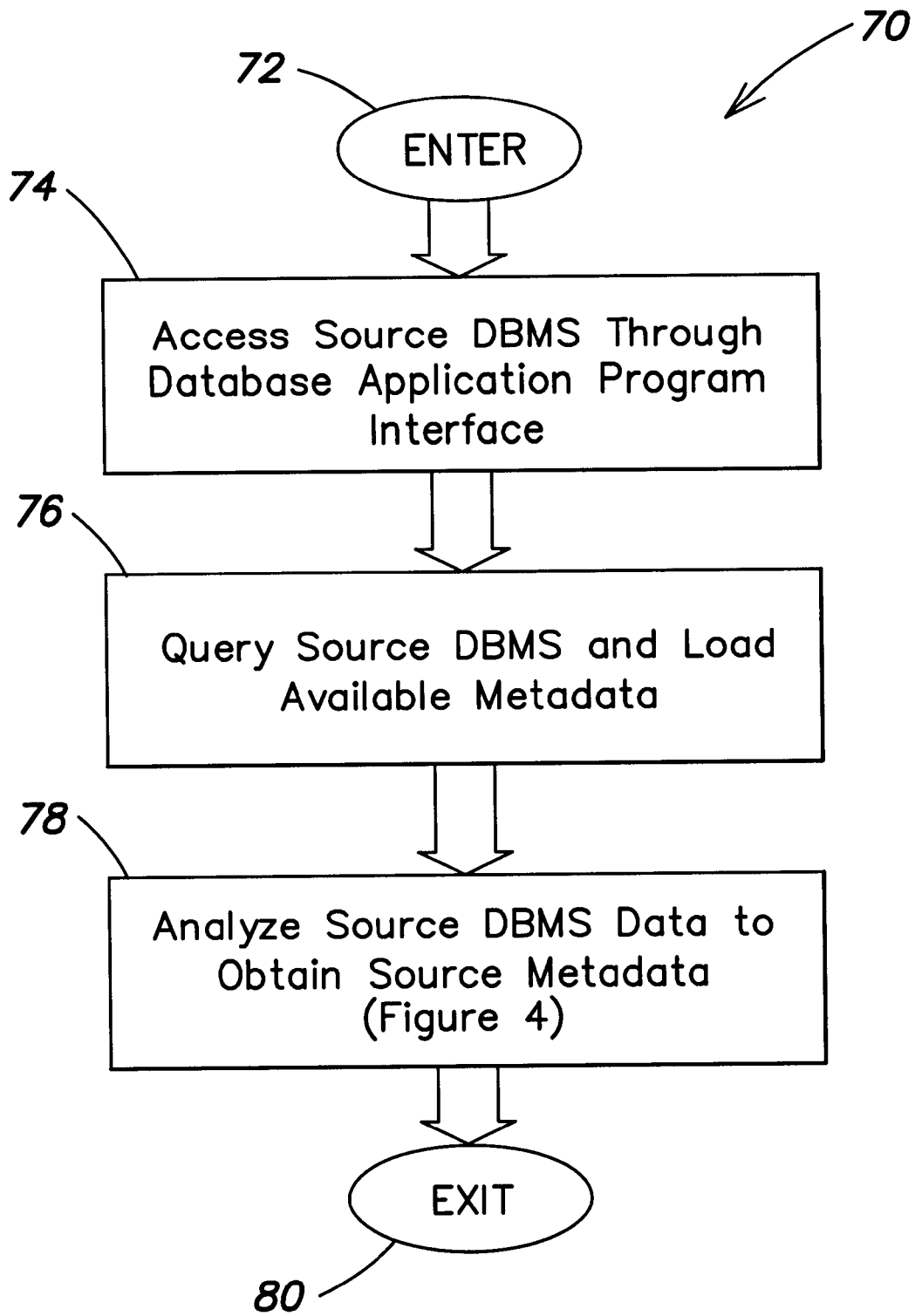
FIG. 3 is a flow chart diagram illustrating the functions performed by the invention in the embodiment of FIG. 1.

This is the first of several process steps performed by the analysis server in the overall method 70, as shown in the flow chart of FIG. 3. Referring to FIG. 3, the server enters the method 70 at the ENTER 72, and performs the process step 74 of accessing the source DBMS following logon to the source DBMS by the operator. Once connected, the server performs process step 76 to query the source DBMS, using SQL commands and the ODBC library of function calls, to obtain all of the available source metadata. As described in detail hereinafter, the elements of the downloaded metadata are stored in respective attribute areas of the structured entity data repository 37.

With the downloaded metadata recorded in the data repository, the analysis server then performs the process step 78 to analyze the source database in the elemental manner referred to above. The analysis results are stored in a separate area of the repository and compared with the metadata entered in the repository in the download process 76. In doing this, it verifies consistent values or rejects conflicting metadata elements entered in the earlier download. It is the metadata obtained with this analysis step that is principal, since it is obtained directly through analysis of the data itself and must, therefore, be accurate. Alternatively, the metadata that is resident in the source is that entered by the source database (DB) developer, based on the belief in its accuracy. In the ideal situation, the two sets of metadata are in agreement and corroborate each other, which is the best case. At the end of step 78, the analysis exits the method at 80.

Figure 4:
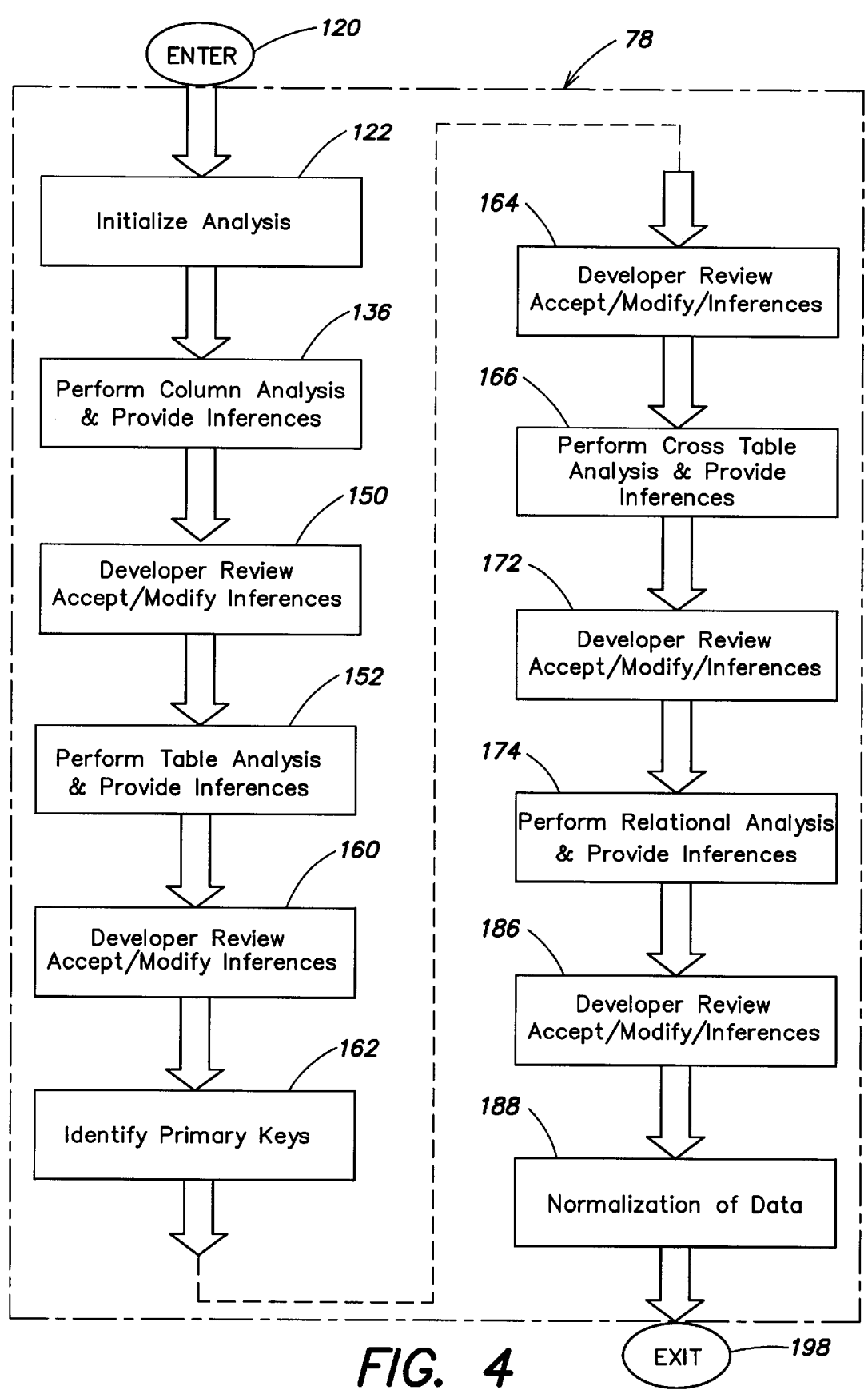
FIG. 4 is a flow chart diagram illustrating further details of one of the functions illustrated in FIG. 3.

FIG. 4 is a further detailed flowchart of the data analysis process 78 of FIG. 3. However, before describing the details of the analysis process it is first necessary to describe the logical and structural model of the data repository 37, which the present inventive method uses to store the source metadata to be migrated to an EDM application, and which facilitates the ordered approach executed by the analysis process. The architecture of the repository is "metadata-centric", in that the atomic elements of the repository data storage structure themselves define the metadata characteristics to be obtained for the source data that is being modeled. Its data storage structure is independent of the structure, definitions, or constructs of the source data structure, so as to provide a generic storage model that is suitable as a data source from which EDM applications may be generated in any desired model, format, or language.

Figure 5:
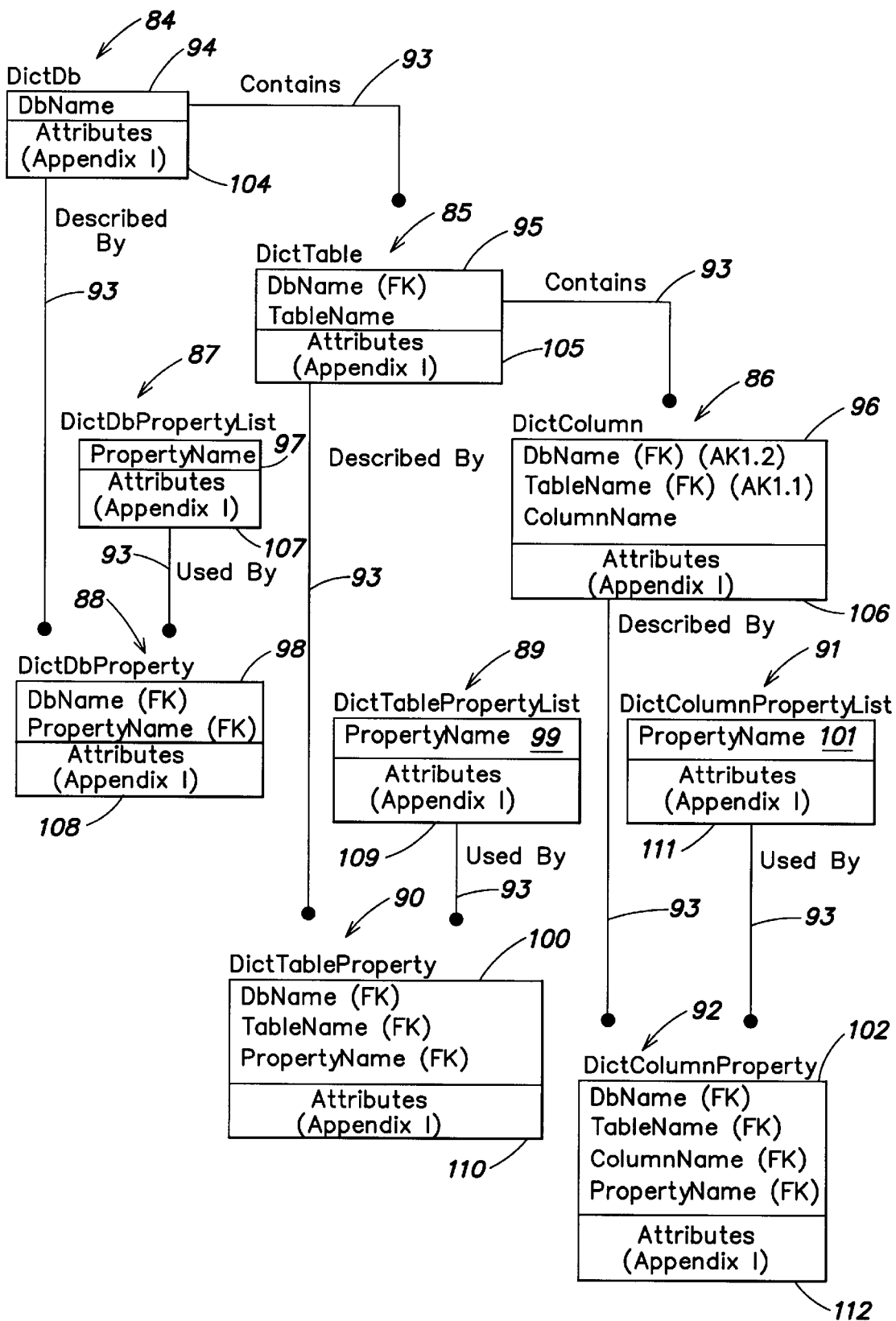
FIG. 5 is an entity relationship diagram illustrating the structure and functional relationships of the data entities established within the data repository of the present invention.

FIG. 5 is a summary entity-relationship diagram for the data repository 82, which contains the data entities 84–92 that represent the data structure of a generic source database (i.e., a database having one or more tables, each table having one or more columns, and each column having one or more rows), as well as the key fields ("keys") of the database tables and the relationships between the tables. The entities are described below. They each include in their name the abbreviation "Dict" for "Dictionary". This term is referential, but is used here to connote the definitive nature of the analysis performed by the present invention in determining the source metadata.

The data repository entities are:

DictDb

The DictDb entity 84 is structured to hold all of the "standard" informational properties of a generic source database. At the minimum, this entity includes the physical and logical name of the source database; the type/category (e.g., RDBMS, SEQUENTIAL) of the source database; the physical location of the source database; and the information required to establish a connection to the source database.

DictTable

The DictTable entity 85 is structured to hold all "standard" informational properties of a generic table within a generic database. At the minimum, this entity includes the physical and logical name of the table; the type of table (e.g., CSV, FIXED, DELIMITED, RELATIONAL, ODBC, SEQUENTIAL); the physical location of the table; and the information required to establish a connection to the table.

DictColumn

The DictColumn entity 86 is structured to hold all "standard" informational properties of a generic column within a given generic table and generic database. At the minimum, this includes the physical and logical name of the column; the physical sequence (placement) of the column within the table; and the data type characteristics of the column data.

DictDbPropertyList

The DictDbPropertyList entity 87 is a collection of additional database property types that may optionally be applied to the definition of the database. This collection supplements the "standard" database properties which are attributes of the DictDb entity 84. It allows for the expansion of the DictDB attributes without restructuring the DictDb entity itself. Every instance of this entity represents a single optional property that may be realized by creation of an instance of the DictDbProperty entity 88 (described below) for a given database. This entity is simply a list showing the valid optional properties, such that one or more may be utilized for a given database.

DictDbProperty

The DictDbProperty entity 88 is a collection of additional informational properties for a given database, each of which is of a type defined by an instance of the DictDbPropertyList entity 87.

DictTablePropertyList

The DictTablePropertyList entity 89 is a collection of additional table property types that may optionally be applied to the definition of a given table. This collection supplements the "standard" table properties which are attributes of the DictTable entity 85. Every instance of this entity represents a single optional property that may be realized by creation of an instance of the DictTableProperty entity 90 (described below) for a given table. This entity is simply a list showing the valid optional properties, such that one or more may be utilized for a given table.

DictTableProperty

The DictTableProperty entity 90 is a collection of additional informational properties for a given database, each of which is of a type defined by an instance of the DictTablePropertyList entity 89.

DictColumnPropertyList

The DictColumnPropertyList entity 91 is a collection of additional column property types that may optionally be applied to the definition of a given column. This collection supplements the "standard" column properties which are attributes of the DictColumn entity 86. Every instance of this entity represents a single optional property that may be realized by creation of an instance of the DictColumnProperty entity 92 (described below) for a given column. This entity is simply a list showing the valid optional properties, such that one or more may be utilized for a given column.

DictColumnProperty

The DictColumnProperty entity 92 is a collection of additional informational properties for a given column, each of which is of a type defined by an instance of the DictColumnPropertyList entity.

In practice, each of the above described entities 84–92 may be implemented as a separate table within the data repository 37 (FIG. 1) (i.e., the physical memory storage device which is the underlying structure of the repository). The relationships between the entities are generally "one-to-many," which means that an instance (or "attribute") of one entity (e.g., the parent) may be related to many instances (attributes) of the another entity (e.g., the child).

In FIG. 5, these relationships are evidenced by "relationship lines" 93 between the entities 84–92. A solid color circle terminating a relationship line 93 at an entity identifies the terminal entity as the child in the relationship. To assist the reader in understanding the nature of the relationship, each line also includes a verb phrase in italics to suggest the meaning of the relationship. As an example, the phrase "contains" adjacent the relationship line 93 between the DictDb entity 84 and the DictTable entity 85 identifies the fact that the DictTable entity is included within the DictDb entity. The terminating solid circle at the terminal end of the relationship line also identifies the DictTable entity as the child of the parent DictDb entity.

As stated above, the repository of the present invention provides representation of the data structures of a generic model database. The generic attributes of the data objects of the model database are represented as properties of the DictDb, DictTable, and DictColumn entities. In the summary Entity-Relationship Diagram of FIG. 5, the entities 84–92 are only shown with their respective "primary keys" 94–102, which are the attribute characteristics that uniquely identify occurrences of each entity. For example, the "(FK)" designation following the attribute "DbName" 95 in the DictTable entity 85 indicates that this attribute supports a foreign key used in the DictTable entity relationship to the DictColumn entity 86.

The principal attributes 104–112 of the FIG. 5 entities 84–92 are listed in Appendix I. Referring to Appendix I, the identified attributes for each entity are those considered suitable to define a generic form of the entity that they are associated with. Collectively, they define all of the attributes foreseen as necessary to permit the data modeling of any known type of source database, whether it is a relational database or a collection of data files. It does this through its ability to model all of the characteristics of the source DBMS data, including:
 (i) the data type characteristics of individual source data elements;
 (ii) the grouping of elementary data items into a collection, such as a file or table;
 (iii) the grouping of these collections into an aggregate database;
 (iv) the relationships between data elements within a given collection; and
 (v) the relationships between the collections themselves.
The presence of specialized attributes of source data objects, if they are required to fully describe an instance of that object, are represented using the <object-type>PropertyList entities 87, 89, and 91, and the <object-type>Property entities 88, 90, and 92. The instances of the DictDbPropertyList entity 87, for example, define the valid specialized attributes that may be defined for any DictDb instance. The PropertyName (FK) (foreign key relationship) referencing DictDbPropertyList 87 from DictDbProperty 88 ensures that only valid specialized properties may be used to further define a DictDb entity 84 instance.

Figure 6:
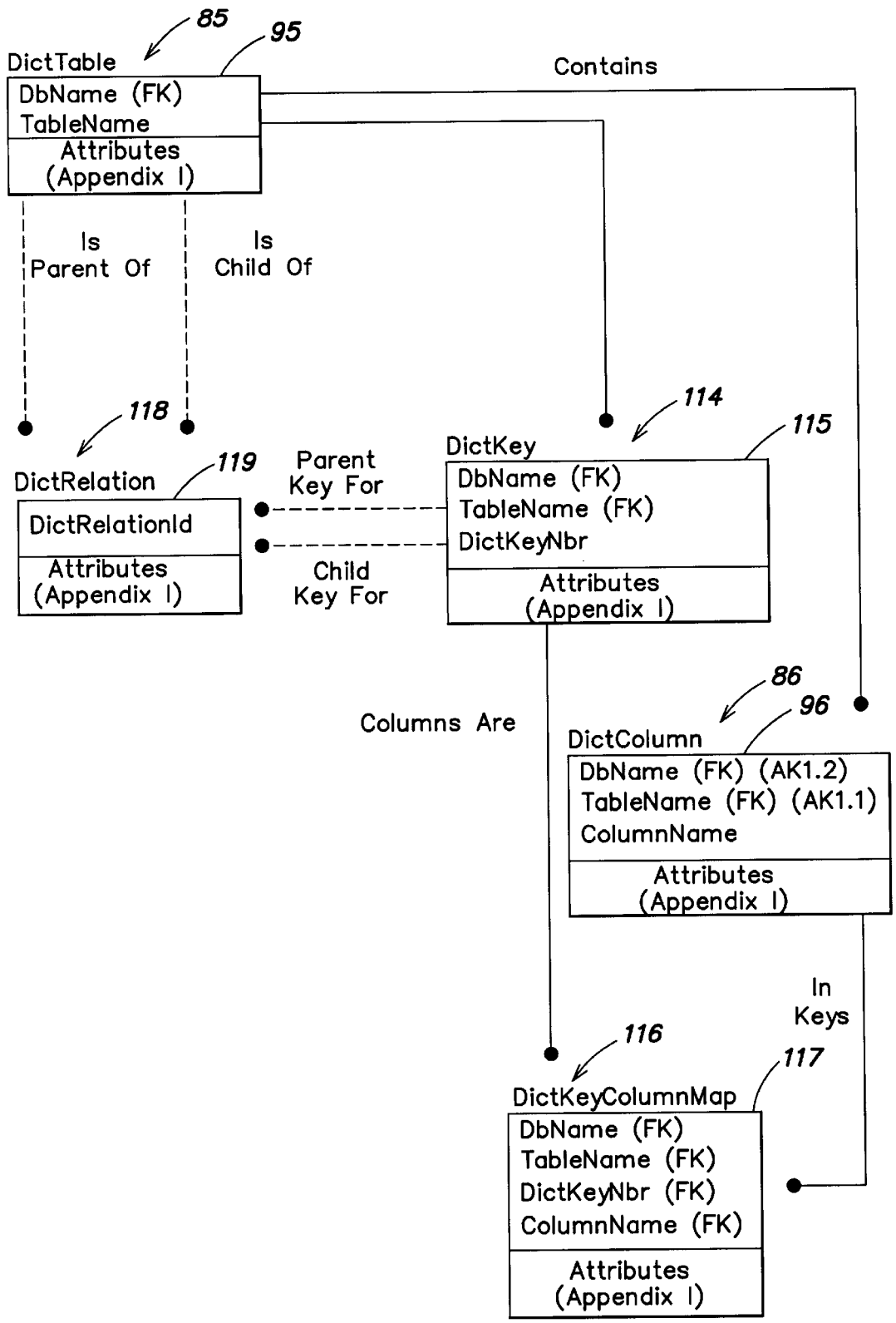
FIG. 6 is an entity relationship diagram used in the description of the functional relationships between the entities of FIG. 5.

The data repository model also provides for dependencies, or relationships, between tables in a source data structure. These relationships are modeled as shown in the summary Entity-Relationship diagram of FIG. 6. The entities illustrated in FIG. 6 which were previously described and illustrated in FIG. 5 (DictTable 85 and DictColumn 86) are shown with their prior reference numerals, while the added entities in FIG. 6 include:

DictKey

The DictKey entity 114 holds all the information for a given key of a table. Several types of keys may be represented, including primary keys, foreign keys, and alternate keys. The DictKey entity 114 can be used to represent both the logical structure and physical characteristics of the table keys.

DictKeyColumnMap

The DictKeyColumnMap entity 116 lists the columns of a table that are used to construct a given key of that table. This entity includes the appropriate sequencing of those columns as required to implement the key.

DictRelation

The DictRelation entity 118 holds the definition of a relationship between two tables, representing one table as the "parent" and one table as the "child" in the relationship. A single table may serve as both parent and child. A given instance of DictRelation 118 is associated with the parent and child tables. A given instance of DictRelation 118 is also associated with the instance of DictKey 114 which represents the primary key of the parent table, as well as the instance of DictKey 114 which represents the foreign key of the child table.

A given relationship (e.g., an instance of a DictRelation entity 118) is represented as having exactly one parent and one child to indicate the customary roles served by, for example, two related tables in a relational database. A single table may serve as both parent and child. Customarily, the parent table will also include the definition of a primary key (i.e., an instance of a DictKey entity 114), which serves to uniquely identify every row in the table. To support the relationship from the child to the parent, the child table may include the definition of a foreign key (another DictKey instance), which corresponds to, or maps to, the primary key of the parent.

The columns that include a key of any type are represented using the DictKeyColumnMap entity 116, which relates the key to a set of one or more DictColumn occurrences, each of which is defined for the containing DictTable instance. The full list of attributes for each entity shown in FIG. 6 may be found in Appendix I.

The generic model data repository described above is capable of representing any collection of database-like data without the need to alter its own data structure or altering the software used to access the data from the repository. In the event that it is necessary to add distinct properties of a given source database in the repository, the use of the several "PropertyList" and "Property" entities allow these properties to be added without modifying the DictDB, DictTable, and DictColunn entities 84–86. The completeness of the metadata capture provided by the repository also ensures that software which is based on the repository structure would be able to connect to any type source database without requiring additional information.

It should also be emphasized, that the generic nature and the comprehensiveness of the model ensures that all details of a source database structure can be obtained to such a complete degree that the source database itself can be replicated from the repository metadata. The repository metadata is not specific to any particular database technology or vendor. As a result, it is capable of being used to generate a wide variety of EDM application applications, in a multiple of different presentation materials and different technologies.

Having described the entity structure, the analysis servers 34 perform the data analysis routine (78, FIG. 3) of the source DBMS 22 (FIG. 1) in several phases. As shown in the flow diagram of FIG. 4, the server 34 enters the process 78 at 120, and performs an initialization step 122. This is an initial step in which the source database definition is prepared for data analysis. This preparation involves the collection of the database table and column definitions into a parallel area of the data repository 37 (FIG. 1). It also establishes the configuration settings that govern the data analysis process so that the data repository can govern and track the procedures that take place in the analysis steps.

Figure 7:
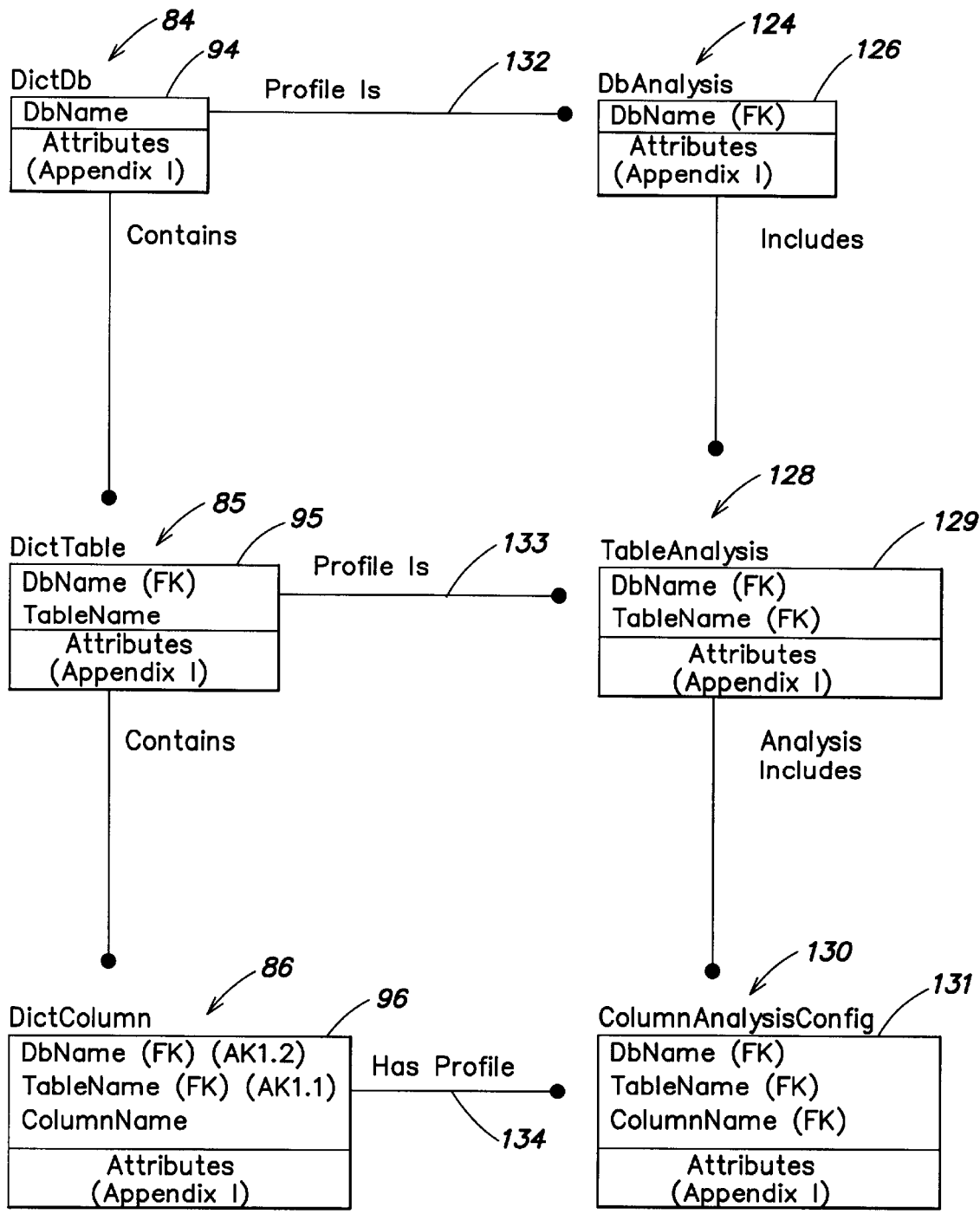
FIG. 7 is an entity relationship diagram used in the description of the functional relationships between the entities of FIG. 5 in performing the data analysis method of the present invention.

To further explain the initialization process 122, and as described in further detail with respect to FIG. 7, there are three data repository entities that comprise the analysis phase. They include a DbAnalysis entity, a TableAnalysis entity, and a ColumnAnalysisConfig entity. Many of the attributes of these entities are utilized as configuration settings that govern one or more phases of data analysis. All such attributes are configurable by the user, which grants considerable control over the algorithms to the user.

DbAnalysis

Some of the configuration attributes of the DbAnalysis entity can be overridden, if desired, at either the table level (for a given table) or the column (for a given column). In these cases, the corresponding set of attributes of the TableAnalysis entity or the ColumnAnalysisConfig entity are utilized.

Column Analysis

During the first step of the source data analysis, which is column analysis, a data sample is obtained for every analyzed column. The method by which the sample is determined is governed by the SamplingMethod, SampleParameter, and SampleMaxRows attributes as described in Table A below:

TABLE A

| SamplingMethod | SampleParameter | SampleMaxRows |
| --- | --- | --- |
| N-th | value of N | value for max number (nbr) of rows |
| Percentage | value for % | percentage for max nbr of rows |
| Random Set | value for N | N/A |

Method "N-th" involves selecting the N-th data record up to a maximum number of rows (SampleMaxRows).

Method "Percentage" involves getting a random number/percent between 0% and 100% for each row read. If random percent is less than or equal to SampleParameter, then this row is included in the set of sample data, up to the specified maximum number of rows (SampleMaxRows).

Method "Random Set" involves calculating a series of random row numbers up to the total number of rows in the set of input data. Inclusion in the set of sample data occurs if the N-th row number (during sequential processing) is also present in the randomly-generated set of row numbers. SampleMaxRows does not apply since SampleParameter is in effect the exact size.

The following six "threshold" attributes collectively support enhanced inference capabilities:

(i) FunctionalDepThreshold—During table analysis, the minimum percentage of values in a given column which must be dependent on the determinant column(s) before the dependency is recognized and recorded.

(ii) CommonDomainThreshold—During cross table analysis, the minimum percentage of the values of a column that must participate in a domain intersection before a common domain situation will be identified and recorded using the CommonDomain entity. The percentage of BOTH candidate columns must meet or exceed this threshold.

(iii) NullityThreshold—During column analysis, if the percentage of null/empty values for a given column exceeds this threshold, then the associated inference (that the column permits null/empty values) will be made. This process enables the identification of column nullity even when a degree of "dirty data" is present.

(iv) ConstantThreshold—During column analysis, if the percentage of inferred constants for a given column exceeds this threshold, then the associated inference (that the column represents a constant value) will be made. This process enables the identification of constants even when a degree of "dirty data" is present.

(v) UniquenessThreshold—During column analysis, if the percentage of unique, non-null values for a given column exceeds this threshold, then the associated inference (that the column represents unique, non-null values) will be made. This process enables the identification of column uniqueness even when a degree of "dirty data" is present.

(vi) AllDistinctValuesTreshold—During column analysis, if the percentage of non-null values which are also unique exceeds this threshold, then the associated inference (that the column represents either non-null or unique values) will be made. This process enables the identification of columns with unique values even when a degree of "dirty data" is present.

Dealing with Case Sensitivity

During column analysis, character data values must be processed correctly regarding the case of the characters. The CaseSensitivity and CaseChange attributes are used to determine the case handling. If the CaseSensitivity is set to 'Y', then the data values are processed unchanged (their case is preserved during processing). If set to 'N', the CaseChange attribute specifies the desired case. This is part of the process of building canonical data values for later processing. CaseChange—If set to 'Upper', character data values are converted to uppercase. If set to 'Lower', character data values are converted to lowercase. If CaseSensitivity is set to 'Y', then this attribute is ignored.

TreatAsBlobSize

During column analysis, if the length of a data value is greater than or equal to this setting, then a checksum value is generated to represent this data value instead of processing and storing the actual large data value. This is part of the process of building canonical data values for later processing.

NullStringValue

During column analysis, the specified value is used as a NULL value for character string data types.

NullNumericValue

During column analysis, the specified value is used as a NULL value for numeric data types.

ColumnAnalysisConfig

All attributes of the ColumnAnalysisConfig entity exist only as column-specific overrides for corresponding attributes (settings) which may also be specified at the table and/or database level.

TableAnalysis

During table analysis the DeterminantColumn entity count represents the maximum number of determinant columns that were considered during the last run of table analysis for this table. One occurrence of the DeterminantColumn entity will exist for each such determinant column, and the DetColumnCountUsed represents the maximum number of determinant columns that were considered during the last run of table analysis for a given table. If table analysis is subsequently repeated, this knowledge can be used to optionally skip a given table if the currently selected maximum number of determinant columns has not changed. This is a performance optimization that is especially relevant since table analysis has the potential to be a long-running process. All other attributes of the TableAnalysis entity exist only as table-specific overrides for corresponding attributes (settings) which may also be specified at the database level.

Determining Column Key Coverage

During primary key analysis, an aggregate dependency is only recognized as a candidate primary key if the percentage of table columns that are dependent upon the determinant column(s) exceeds the KeyCoverageThreshold. Assume:

D=the number of determinant columns associated with the aggregate dependency;

d=the number of dependent columns associated with the aggregate dependency; and

T=the total number of table columns that are NOT constants

The percentage for a given column is calculated as: d/(T−D)×100

Cross Table Analysis

During cross table analysis, the SynonymRequiresTypeMatch setting is used to specify whether or not two columns being considered for common domains are required to share the same basic data type. The default is 'Y'. If set to 'Y', then ColumnInfoInferred. DataTypeChosen must be identical for both columns being considered.

The summary entity relationship diagram of FIG. 7 shows the data repository entities that are used to prepare for and control the data analysis process. Referring to FIG. 7, as earlier described and illustrated with respect to FIG. 5, the data repository structure includes an "instance" of a DictDb entity 84 for each source database to be analyzed, and the initialization step 122 provides an instance of a DbAnalysis entity 124. The DbAnalysis entity 124 includes the DbName primary key 126, as well as configuration settings and other information shown in Appendix I. Similarly, the initialization step 122 creates an instance of a TableAnalysis entity 128, with its primary keys 129 and its Appendix I settings, for every instance of a DictTable entity 85 within the source database being analyzed. Finally, a ColumnAnalysisConfig entity 130, with primary keys 131 and Appendix I settings is created for every instance of a DictColumn entity 86 within the DictTable entity 85.

As may be evident, DbAnalysis 124, TableAnalysis 128, and ColumnAnalysisConfig 130 are each structural entities of the data repository which are used, as necessary, for a given source database configuration, to govern the incremental steps of the analysis through their individual configuration settings (see Appendix I). As seen from the relationship lines 132–134 the individual analysis entities 126, 128, and 130 are each the child of the parent DictDb, DictTable, and DictColumn entities 84–86.

Referring again to FIG. 4, following the initialization step 122, the process 78 performs a column analysis step procedure 136. The column analysis is the process of examining the values of individual data values in each column of the source database, and recording what can be learned and/or inferred about them. During the column analysis procedure, each column in each table of the source database is examined individually. Many characteristics of the data in a column are recorded, including:

(i) the minimum, maximum, and average length of values, both before and after any preprocessing (such as removing leading spaces or zeros);

(ii) the minimum and maximum precision (to the left of the decimal point) and scale (to the right of the decimal point) for numeric values;

(iii) the minimum and maximum numeric values;

(iv) the number of empty values, number of NULL values, and number of non-NULL non-empty values.;

(v) the number of distinct values;

(vi) the basic data types encountered: TinyInt (1–2 digits), SmallInt (1–4 digits), Integer (5–9 digits), Decimal, Float1, Float2, String, and DateTime; and (vii) for DateTime values, the specific date/time formats found (referred to as "ExtendedType").

Also, the least frequent and most frequent values are captured so that they can be reviewed if needed. These are the actual source data values, without regard to data type (character or numeric). They represent partial distributions of the source data. They are made available for review by the operator as supporting data for the inferences made by the method.

In addition to recording the observed source column data characteristics, the column analysis procedure 136 also makes certain inferences about the data, such as:

(i) the data type, its precision, and its scale;

(ii) the date/time format for DateTime data types;

(iii) whether or not NULLs are permitted;

(iv) whether or not the column contains a constant value; and (v) whether or not the column values are unique.

Many of the functions performed during the column analysis procedure are subject to the configuration settings. These settings are stored in the DbAnalysis entity (for settings global to a database), the TableAnalysis entity, and the ColumnAnalysisConfig entity.

Figure 8:
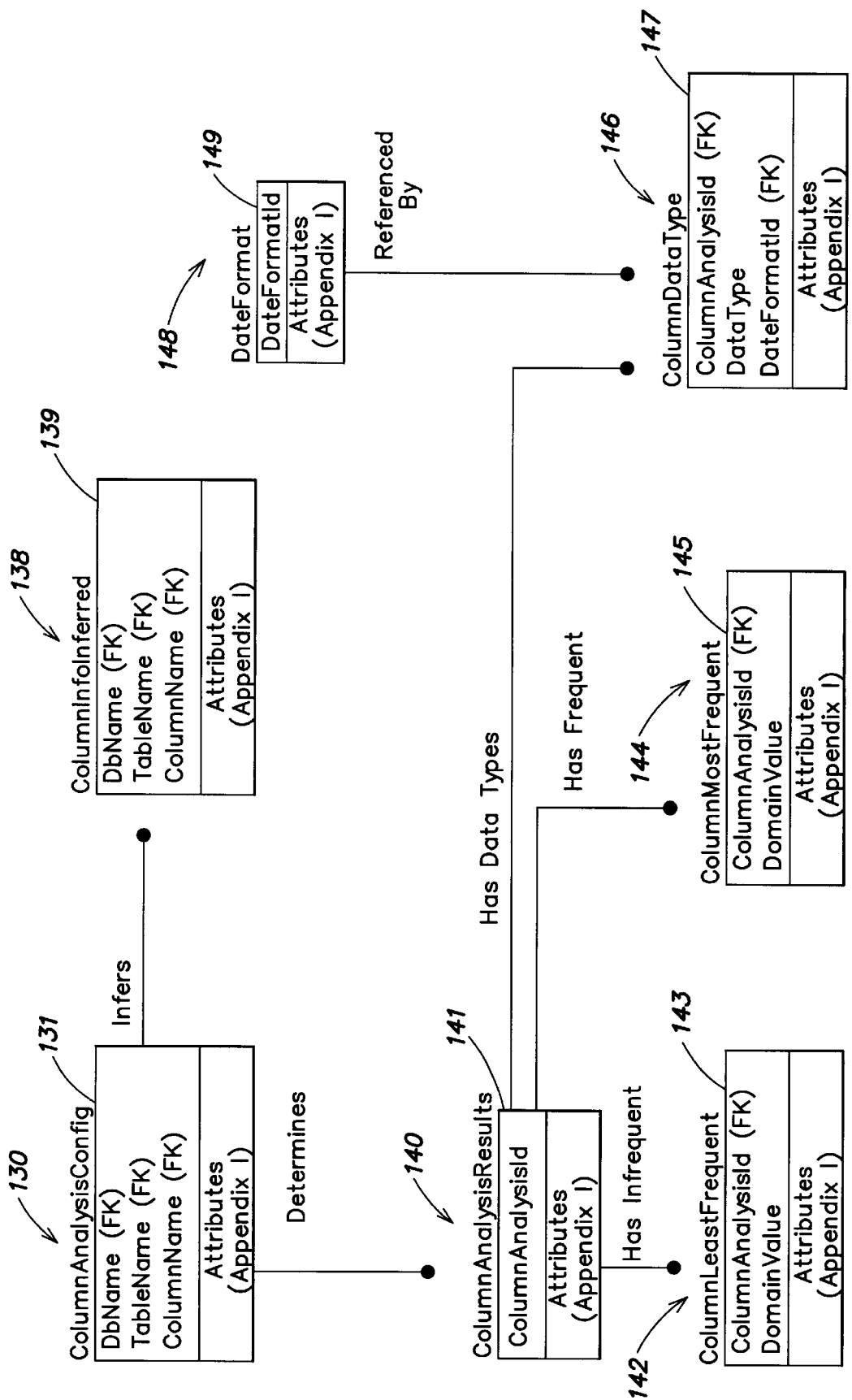
FIG. 8 is another entity relationship diagram used in the description of the functional relationships between the entities of FIG. 5 in performing the data analysis method of the present invention.

The repository entities used during column analysis are shown in the entity summary diagram of FIG. 8. As shown in FIG. 8 the ColumnInfoInferred entity 138 (with primary keys 139) and ColumnAnalysisResults entity 140 (with primary keys 141) are both children of the ColumnAnalysisConfig entity 130. Each instance of these entities 138, 140 represent the inferences and results of analysis of one column of a source database column. The ColumnAnalysisResults entity 140, together with a ColumnLeastFrequent entity 142 (with primary keys 143), a ColumnMostFrequent entity 144 (with primary keys 145), and a ColumnDataType entity 146 (with primary keys 147) represent raw results of the analysis process.

The DateFormat entity 148 (with primary keys 149) provides the definitive list of all recognizable date/time formats, from which a candidate date format may be chosen for a given ColumnDataType instance. The ColumnInfoInferred entity 138 captures the recommended characteristics for each analyzed source data element. This entity forms the basis for generation of data models from an analyzed database. Appendix I shows all the attributes of the entities involved in column analysis.

Referring again to FIG. 4, following completion of the column analysis procedure 136 the process pauses at step 150 to provide a review phase in which the operator may review the inferences made by the present method in its column analysis phase. The column analysis inferences are a necessary antecedent to each of the analysis phases to follow. In this review phase 150, the operator may either accept or modify the inferences made by the invention in the column analysis phase.

Following review the operator commands the table analysis procedure 152. The table analysis process 152 is one of examining the relationships between all of the columns of a source database table, and identifying all of the functional dependencies between them. Such a functional dependency exists within a given table T if a column C1 is dependent on, or determined by one or more other columns (e.g., a set "S" of columns) within the table. S is a set of one or more columns that does not include the dependent column C1. The set of columns S on which C1 is dependent is known as the determinant. Therefore, a dependency exists if, for a given value of the determinant S, the values of the dependent column C1 are always the same.

Identifying these functional dependencies is important because it supports the identification of primary keys and relationships, and supports the process of table normalization. The data repository entities used in the table analysis procedure are shown in the summary entity diagram of FIG. 9. Many of the functions performed during the table analysis process are subject to configuration settings. Those of the settings which are global to a source database are stored in the DbAnalysis entity (124, FIG. 7) and the settings which are specific to a table selected for analysis are stored in the TableAnalysis entity (128, FIG. 7).

Figure 9:
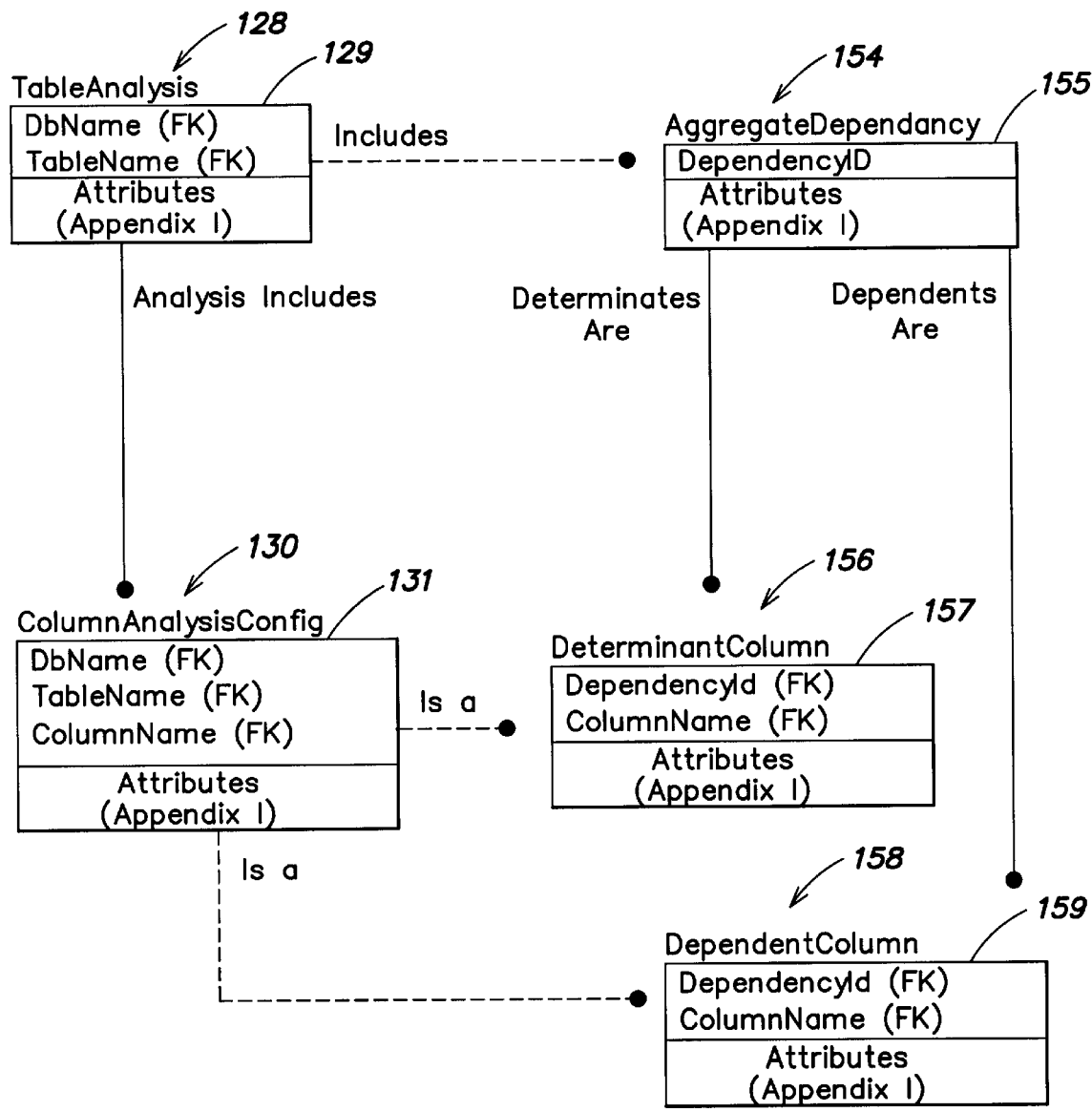
FIG. 9 is another entity relationship diagram used in the description of the functional relationships between the entities of FIG. 5 in performing the data analysis method of the present invention.

FIG. 9 illustrates the working relationship of the TableAnalysis 128 with those data repository entities which are involved with the table analysis procedure. The AggregateDependency entity 154 (with primary key 155) represents those functional dependencies detected within a table being analyzed. It is named "aggregate" because it addresses all columns that are dependent upon a given determinant, as opposed to the definition of a functional dependency, which addresses only a single dependent column. Collecting all such dependent columns into a single aggregate dependency simplifies the process of identifying and processing dependencies.

For a given AggregateDependency entity 154, the set of columns that comprise the determinant is recorded using the DeterminantColumn entity 156 (with primary keys 157). One occurrence of the DeterminantColumn entity will exist for each such determinant column found in the analysis. The DependentColumn entity 158 (with primary keys 159) is used to represent each dependent column for a given dependency. Appendix I lists all the attributes of the entities involved in the table analysis process.

Referring again to FIG. 4, following completion of the table analysis procedure 152, the present method again pauses at 160 to provide a review phase in which the operator may review the inferences made in the table analysis. Once again the operator may either accept the table analysis inferences or modify them before proceeding. Following the review, the operator commands the primary key analysis 162.

The primary key analysis is the process of identifying all candidate keys for each analyzed source database table. A primary key is a set of columns (i.e. the determinant of a dependency) upon which all remaining columns are dependent. The goal is to detect a column, or set (S) of columns, which might be best suited as the primary key for each table. For a given source database, the primary key analysis may result in identifying anywhere from none to one or more candidate dependencies that are best suited as "candidate primary keys".

The primary key analysis uses the results obtained from the table analysis process 152 (FIG. 4), which identifies the dependencies among the columns of a table, and one or more of these dependencies will potentially become candidate keys. The data repository entities used during the primary key analysis procedure are the same as those shown in FIG. 9 for the table analysis entities. The results of the primary key analysis are represented by the AggregateDependency entity 154 of FIG. 9. A dependency which is found to be a candidate key is flagged in the corresponding instance (the column's associated source database table) of the AggregateDependency entity.

Following completion of the primary key analysis 162 (FIG. 4), and a pause 164 to permit the operator to accept or modify the primary key inferences made by the invention, the process next performs a cross table analysis procedure 166. Cross table analysis 166 is the process of comparing each column in each source database table with each column in each other table of the source database to detect columns that share a common "domain". A domain is the set of data values found in a column. If columns from different tables share a common domain, it may indicate the existence of a relationship between the two tables, or, redundant data.

Figure 10:
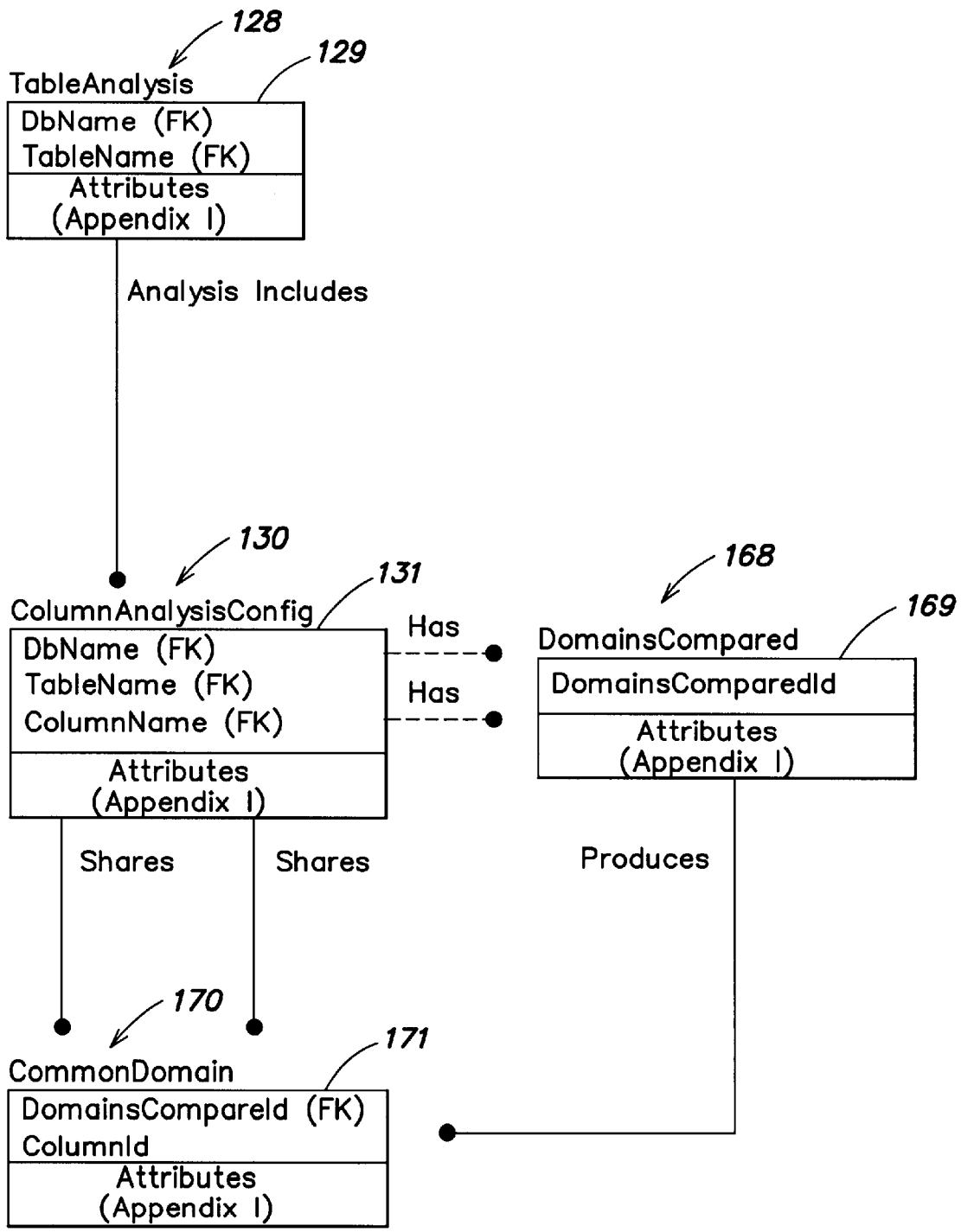
FIG. 10 is another entity relationship diagram used in the description of the functional relationships between the entities of FIG. 5 in performing the data analysis method of the present invention.

The entities of the data repository 37 (FIG. 1) which are used during the cross table analysis are shown in the summary entity diagram of FIG. 10. The entities include the TableAnalysis entity 128 (FIG. 7), which represents the results of each analyzed source table, and the ColumnAnalysisConfig entity 130 (FIG. 7), which represents each analyzed source column. The cross table analysis procedure uses these entities to analyze the column domains of each analyzed source table. A DomainsCompared entity 168 (with primary keys 169) is a child of the ColumnAnalysisConfig entity 130, and each instance of the DomainsCompared entity represents a pair of columns whose domains have been compared during cross table analysis. Any common domains which are found in the process are recorded in a CommonDomain entity 170 (with primary keys 171).

A domain comparison is a bi-directional process. As an example, the process may conclude that a domain of column C1 of table T.1 (referred to here as column T1.C1) is contained to a substantial degree in column C2 of table T2 (i.e., column T2.C2). The process looks at the common domain from the perspective of each column to make the distinction between dependency or redundant data. An instance of the CommonDomain entity 170 is created for each such conclusion. If no common domain is detected from the perspective of either column, then no instance of the CommonDomain entity is created.

The CommonDomain entity 170 is a child of the DomainsCompared entity 168. Each instance of the CommonDomain entity 170 represents the fact that the domain of a "base" column T1.C1 is largely contained within the domain of a "paired" column T2.C2, where T2 is not the same table as T1. A common domain occurrence is determined from the perspective of the base column. It should be understood that, for a given pair of columns in the DomainsCompared entity 168, there may be zero, one, or two rows in the CommonDomain entity 170. Also the degree to which the domain of the base column is contained within the domain of the paired column is indicated by a calculated percentage of domain intersection. A common domain is only noted if the percentage meets or exceeds the CommonDomainThreshold configuration setting in the DbAnalysis entity (see the DbAnalysis entity listing in Appendix I). Appendix I lists all of the attributes of each of the FIG. 10 entities used in this cross table analysis.

Referring again to FIG. 4, following completion of the cross table analysis procedure 166, and following a review interval 172, the present invention next performs a relationship analysis procedure 174. This relationship analysis uses the results of the preceding cross table analysis to make inferences regarding the existence of relationships between columns in the source database tables. The existence of a common domain between T1.C1 and T2.C2, detected during cross table analysis, may be indicative of a relationship between the two tables, T1 and T2.

As an example, referring to Table A below, if it is determined that set S1 of columns C1, C2 in table T1 and set S2 of columns C7, C8 in table T.2 have

TABLE A

| Table Name | Columns Sharing Domains |
|---|---|
| T1 | S1: {C1, C2} |
| T2 | S2: {C7, C8} | the same number of columns per set, and that column C1 shares a common domain with column C7 and column C2 shares a common domain with column C8, and if the primary key of table T2 consists exactly of all the columns (C7, C8) in set S2, then it is then likely that tables T1 and T2 are related, with T2 as the parent in the relationship and T1 as the child. Furthermore, a foreign key of table T1, which relates child table T1 to the parent table T2, consists of exactly the columns in the set S1 (columns C1 and C2). If the above criteria for identifying a primary key/foreign key pairing cannot be satisfied, then the existence of a common domain will be indicative of redundant data rather than a relationship.

Figure 11:
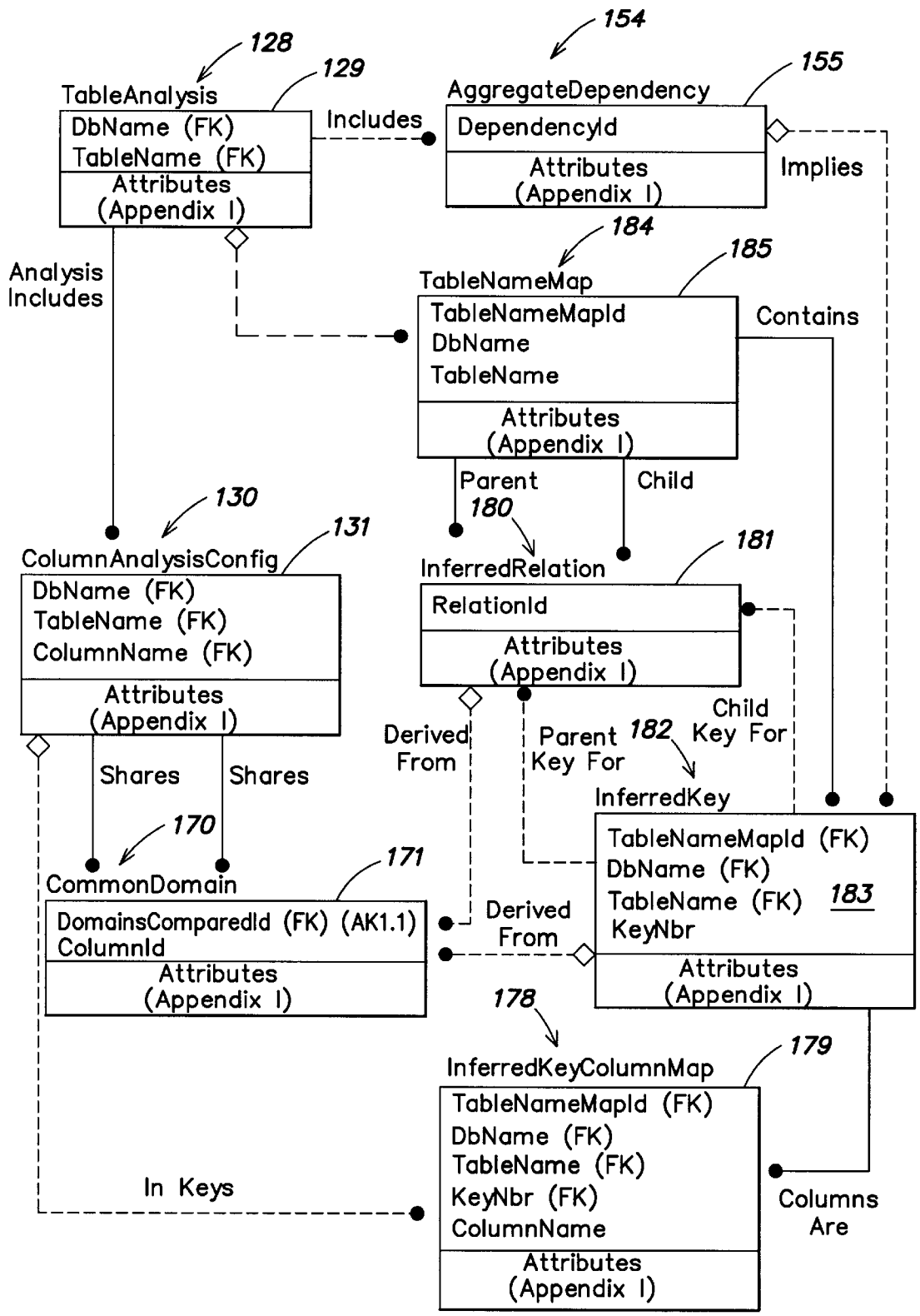
FIG. 11 is another entity relationship diagram used in the description of the functional relationships between the entities of FIG. 5 in performing the data analysis method of the present invention.

The data repository entities used during the relationship analysis process are shown in the summary entity relationship diagram of FIG. 11. Any inferred table key, whether a primary key or a foreign key, is represented by the InferredKey entity 182 (with primary keys 183). If it is a primary key it is related to the instance of the AggregateDependency entity 154 from which it was derived. If it is a foreign key, it is related to an instance of the CommonDomain entity 170 from which it was derived.

Every column that makes up a key is noted by an occurrence of the InferredKeyColumnMap entity 178 (with primary keys 179), which relates the key column to the analyzed table column via the ColumnAnalysisConfig entity 130. Any inferred relationships between source database tables are represented by the InferredRelation entity 180 (with primary key 181). The primary key of the parent table and the foreign key of the child table are noted via parent/child relationships between InferredRelation entity 180 and an InferredKey entity 182 (with primary keys 183). The TableNameMap entity 184 (with primary keys 185) is used to map a given table to all related occurrences of the inferred relationships (InferredRelation entity 180) and the inferred keys (InferredKey entity 182). The full list of attributes of each of the identified entities in FIG. 11 is shown in Appendix I under the title of the particular entity.

As shown in FIG. 11, and as known to those skilled in the art of computer programming, the diamond-like symbols shown associated with the TableAnalysis entity 128, the ColumnAnalysisConfig entity 130, the AggregateDependency entity 154, the InferredRelation entity 180, and the Inferred Key entity 182 signify a "non-identifying relationship" between these "parent" entities and their related child entity. A non-identifying relationship is one in which the child does not get its primary key from the parent. The relationship with the parent is optional, and this is shown with the diamond symbol and the dashed relationship lines. NULLs in the columns of the child entity are permitted.

As shown in FIG. 4, following completion of the relational analysis procedure 174, the method 78 provides for another pause 186 to permit the operator to review the inferences made in the relational analysis and to accept or modify them on an individual basis. At this time the source data analysis is complete. In the best mode embodiment, however, the invention normalizes the source data in step 188. As may be known, normalization refers to the process of transforming a database schema into a form that by design prevents the occurrence of various update anomalies.

Figure 12A:
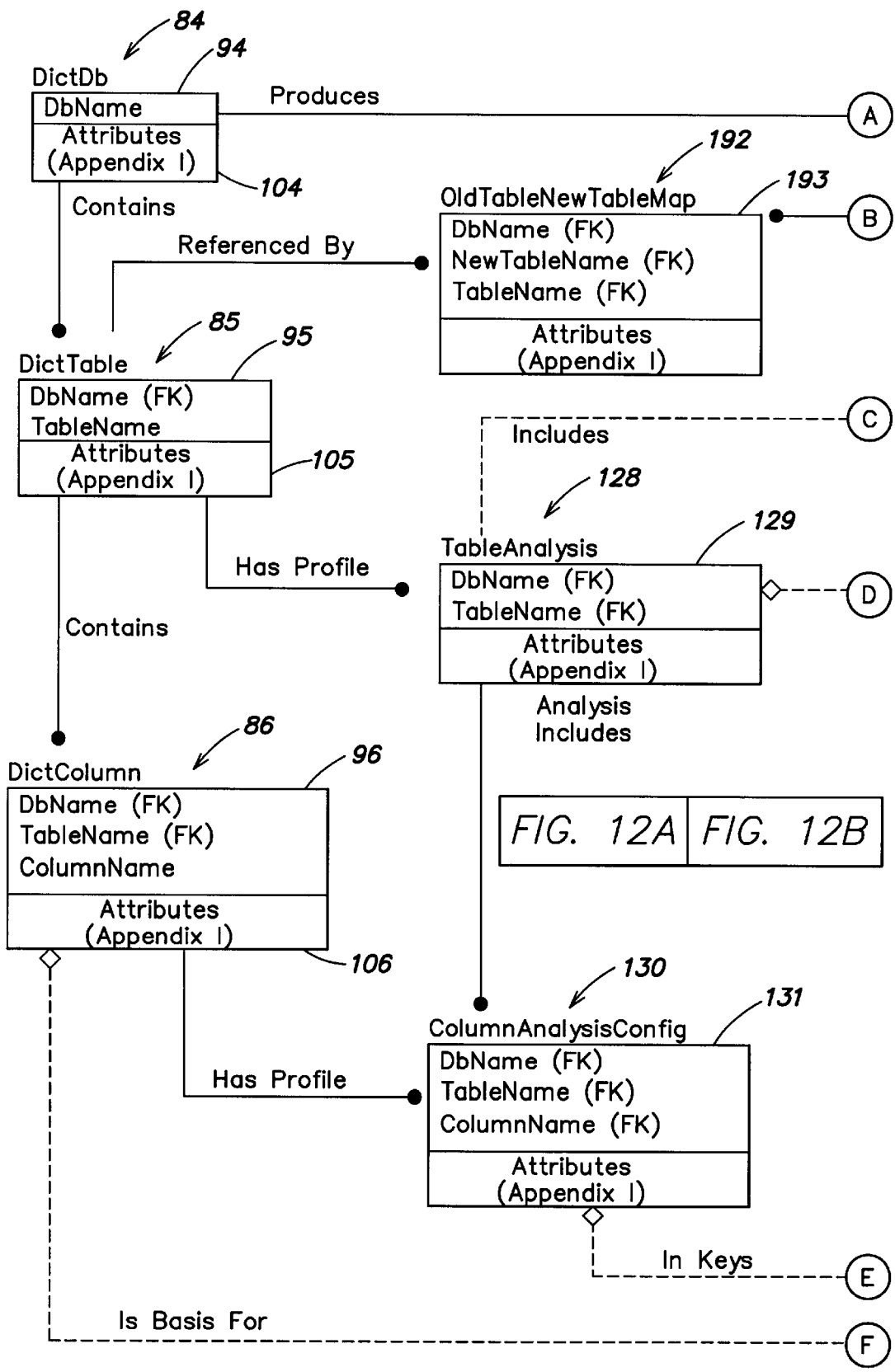
FIGS. 12A and 12B, together, are another entity relationship diagram used in the description of the functional relationships between the entities of FIG. 5 in performing the data analysis method of the present invention.
Figure 12B:
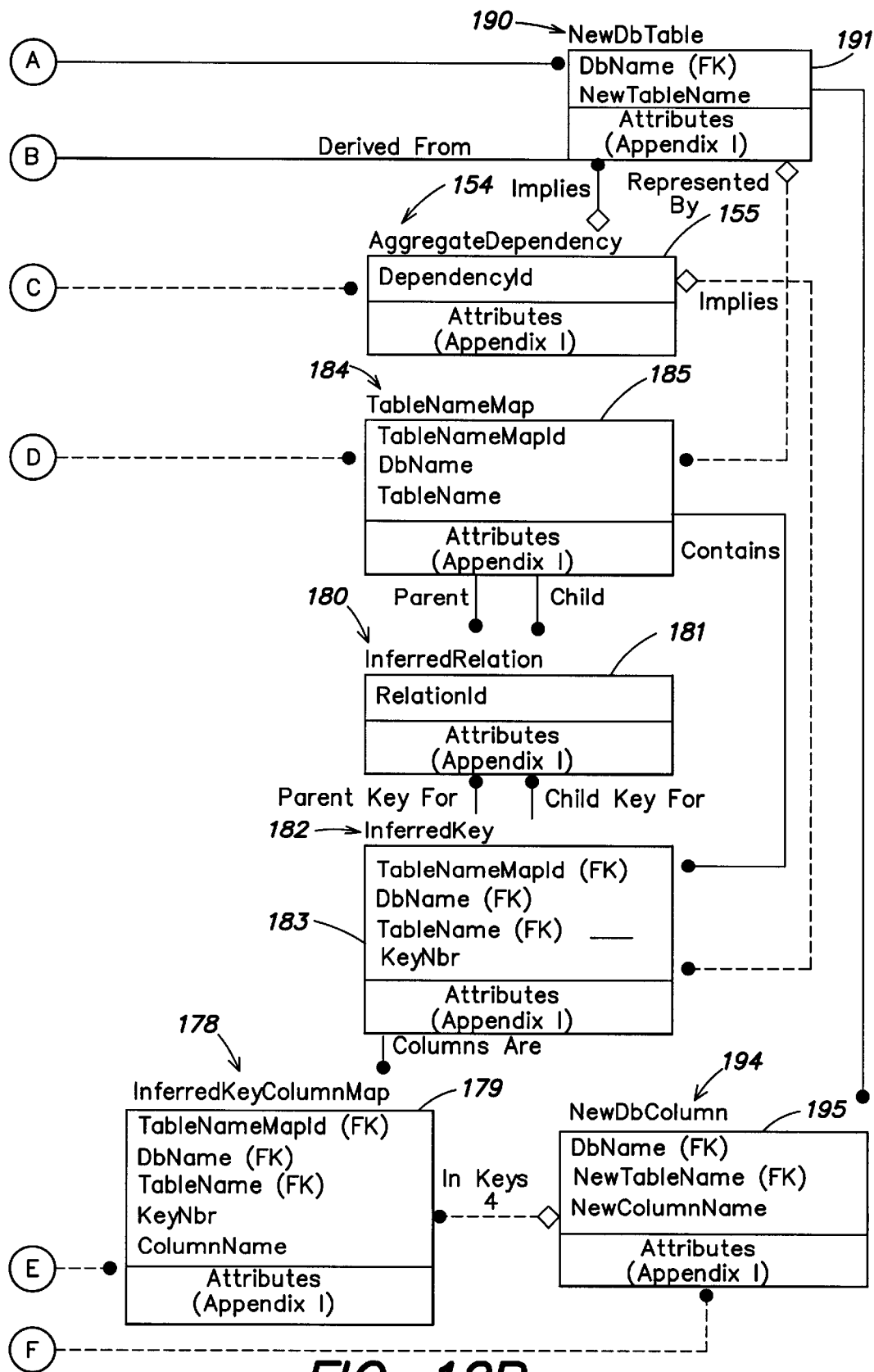

The data repository models data that is in at least $1^{st}$ normal form (i.e. no repeating groups of data items). The data repository supports processes that transform $1^{st}$ or $2^{nd}$ normal form data into $3^{rd}$ normal form and beyond. A table in $3^{rd}$ normal form can contain only columns that are fully dependent upon the primary key. Because the data repository encompasses complete metadata for a fully analyzed database, all the information required to automatically normalize a table and database is available. The data repository entities used during normalization are shown in the summary entity relationship diagram of FIGS. 12A and 12B.

If an AggregateDependency entity 154 exists for a given table, and that dependency is not the basis for the primary key, then the table is not in $3^{rd}$ normal form. The process of normalization therefore considers all such extraneous dependencies as recorded using the AggregateDependency entity.

If an extraneous dependency D exists, then the original table A is split into two tables B and C; each of these is represented by a NewDbTable entity 190 (with primary keys 191). An OldTableNewTableMap entity 192 (with primary keys 193) records the relationship between the original table A and the new tables B and C that are derived from table A.

All columns in the original table A that are not involved in the dependency D are placed in new table B, using a NewDbColumn entity 194 (with primary keys 195), which is a child of the NewDbTable entity 190. The dependent columns of dependency D are placed in the new table C (using the NewDbColumn entity 190) along with the determinant columns of dependency D. These dependent columns then form the primary key of new table C, which is recorded using the InferredKey entity, along with the InferredKeyColumnMap entity 178 to map the key columns back to the original analyzed columns.

The determinant columns of dependency D are also placed in the new table B, because they form the basis for the relationship that must exist between new tables B and C. These determinant columns in new table B are used to define a foreign key using the InferredKey entity 182, and the relationship between new tables B and C is recorded using the InferredRelation entity 180. The instance of a InferredRelation entity 180 links the InferredKey entity instance for the foreign key of new table B with the InferredKey instance for the primary key of new table C.

Occurrences of all newly created instances of the NewDbTable and NewDbColumn entities are related to the originating dependency D through use of relationships back to the AggregateDependency instance. As shown in FIG. 4, following the normalization step 188 the method exits the process step 78 at 198.

Figure 13:
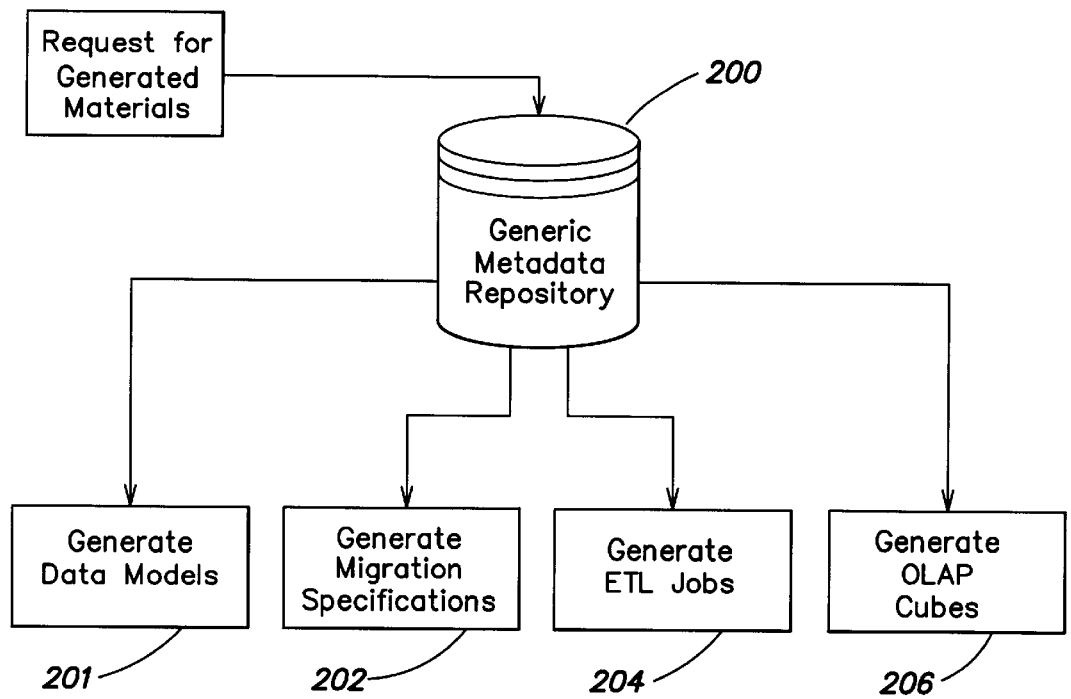
FIG. 13, is a figurative block diagram used in a description of the software code generation capabilities of the present invention, as applied to representative enterprise data management (EDM) applications.

The source metadata obtained by the present method and stored in the data repository, may be transformed into a wide variety of EDM applications. This transformation is accomplished through automatic generation of the executable software code for these EDM applications directly from the source metadata within the repository. This is made possible by the comprehensive nature of the source metadata, due in turn to the generic entity structure of the data repository. The transformation may be made into any known EDM application. FIG. 13 identifies four representative EDM applications for which program code may be generated directly from the data repository 200. They include: generation of data models 201, generation of migration specifications 202, generation of ETL jobs 204, and generation of presentation materials such as OLAP cubes 206.

Figure 14:
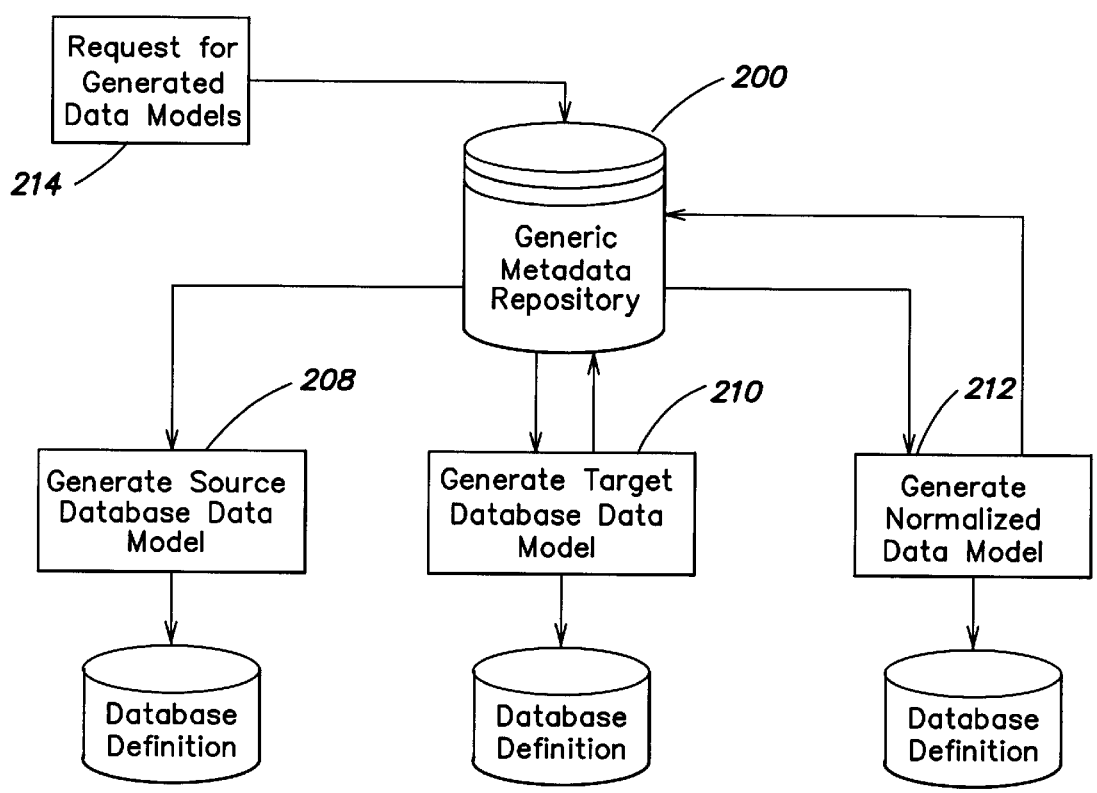
FIG. 14, is a figurative block diagram used in a description of the performance of the present invention in generating software code for the EDM applications illustrated in FIG. 13.

As shown in FIG. 14, the program code may be directly generated from the data repository 200 for a source database data model 208, a target database data model 210, and a normalized data model 212 upon a request 214 by a user for generated materials. The code generation of the data models 201 may be achieved through a variety of procedures. These include:

(i) using the existing database schema which may be loaded into the repository from the existing source database, or entered manually;

(ii) using a new database schema; either that is derived from the analysis results stored in the data repository, or one which is entered manually;

(iii) using a normalized database schema, as derived from the normalization function (FIGS. 12A, 12B) and/or the results of the data analysis (FIGS. 4–11).

When generated from the repository, the resulting data model is dependent on the procedures used to create the schema. The generation of a data model of the source database is generated on the basis of the current state of the source database schema, as defined by the set of dictionary entities DictDb (84, FIG. 5), DictTable (85, FIG. 5), DictColumn (86, FIG. 5), DictRelation (118, FIG. 6), DictKey (114, FIG. 6), and DictKeyColumnMap (116, FIG. 6). A data model of the target database schema is also generated on the basis of the current state of the database schema defined by the same dictionary entities, subject to being modified based on the results of data analysis (e.g., the generated column data types may be indicated by the inferred results of column analysis). The dictionary defined database schema may also be used to provide a data model of a normalized database schema, subject to modification based on the results of the normalization step in addition to the results of the data analysis.

If a data model is generated using the basic set of dictionary entities, then there is no need to update the repository. However, if the data model is derived from the results of data analysis and normalization, the generation process saves the resulting data model in the repository as a completely new database schema, using the dictionary entities. This permits investigation of different versions of a database schema by analyzing an existing schema, making different design choices, and saving each version as a unique schema definition in the repository. Each different version can then be tested by using a physical database, if needed.

The resulting product of the data model generation process can take several forms, including:

(i) a file containing the database definition in standard ANSI SQL 92 syntax;

(ii) a file containing the database definition in a vendor-specific SQL syntax;

(iii) a sequence of function calls to a vendor-specific API, or it may make use of a communication protocol which causes the database to be created, or it may inform a different product about the database definition; or (iv) the creation of a file or document in another format, such as extensible markup language (XML) for Internet- (web-) based documents, to convey the database definition.

The present invention supports the full data analysis for a source database schema. An analyzed schema can then be normalized, if desired, to complete the analysis process. At any stage of the analysis process, a new database schema can be generated to reflect the current state of the analysis. The data model that results from this generation can be represented using the DDL (data definition language) of the chosen target DBMS.

Figure 15:
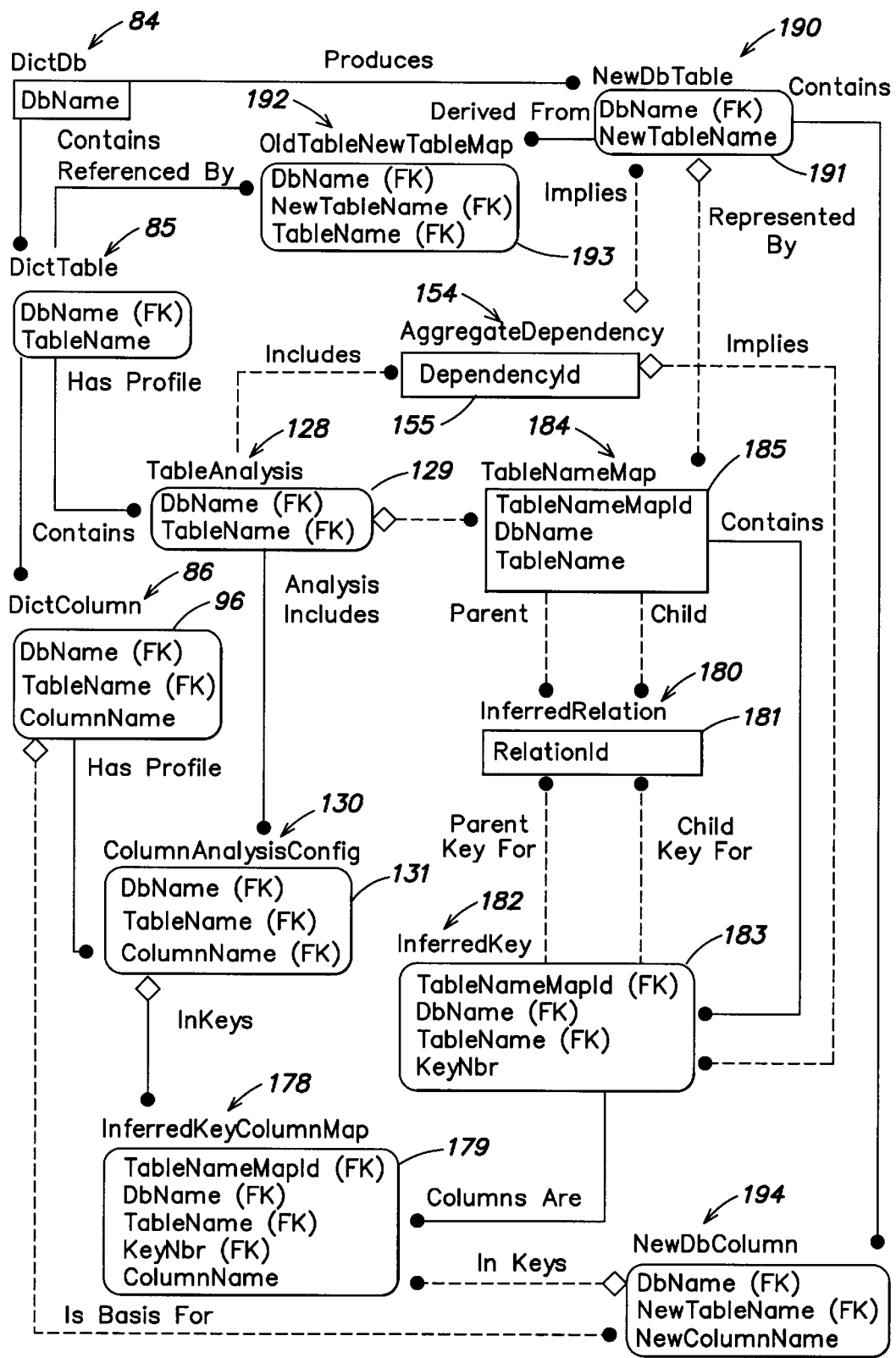
FIG. 15 is another entity relationship diagram used in a description of the functional relationships between the entities of the data repository in generating the content information of a data model, which is one of the representative EDM applications identified in FIG. 13.

A database schema can also be generated which represents an exact copy of the source database as it existed before any changes made during analysis. The primary entities referenced during generation of a data model from an analyzed database are shown in the entity relationship diagram of FIG. 15. The full list of attributes for each of the FIG. 15 entities can be found in Appendix I under the related entity heading. In addition, the DictDb, DictTable, DictColumn, DictRelation, DictKey, DictKeyColumnMap, and ColumnInfoInferred entities (described hereinbefore) may also be referenced, depending on whether or not the source database schema is being copied. If the schema is based on an analyzed source schema, then the ColumnInfoInferred entity will provide the column data type information. If the schema is generated as a copy of the original source schema, then the relationship and key information is obtained from the DictRelation, DictKey, and DictKeyColumnMap entities.

If the data model to be generated is an exact copy of the original source database schema, then the definition is simply copied from the contents of the DictDb, DictTable, and DictColumn entities. If the data model is to include the results of analysis/normalization, then the definition is based on changes noted in the other entities, and supplemented if necessary by DictDb, DictTable, and DictColumn.

In practice, the current state of the database definition stored within the data repository is collected and used to generate the data model in the requested syntax. The definition is commonly generated in the SQL syntax, using ANSI SQL 92, or a supported vendor-specific syntax, such as that for Microsoft SQL Server or Oracle. The definition can also be generated in an XML format. In either case, the definition is created as a text file in the chosen format, which can then be processed by the appropriate utility. The architecture of the data repository includes a construct known as a migration specification, which identifies the transfer protocol for presenting data from a data source to an EDM application.

The migration specification is a complete and detailed collection of mapping expressions (i.e., statements of the functional relationship between a source column and a target column). Within the transformation mapping environment (TME), the mapping expression conforms to T=f(S), where T is a target column, S is a source column(s) and f is some function. This provides the repository with the ability to produce target tables for many types of extract, transform, and load (ETL) jobs. A given migration specification is generic in nature, rather than assuming a specific ETL vendor technology. This generic nature is the key to the ability to automatically generate many different jobs from a single specification.

Figure 16:
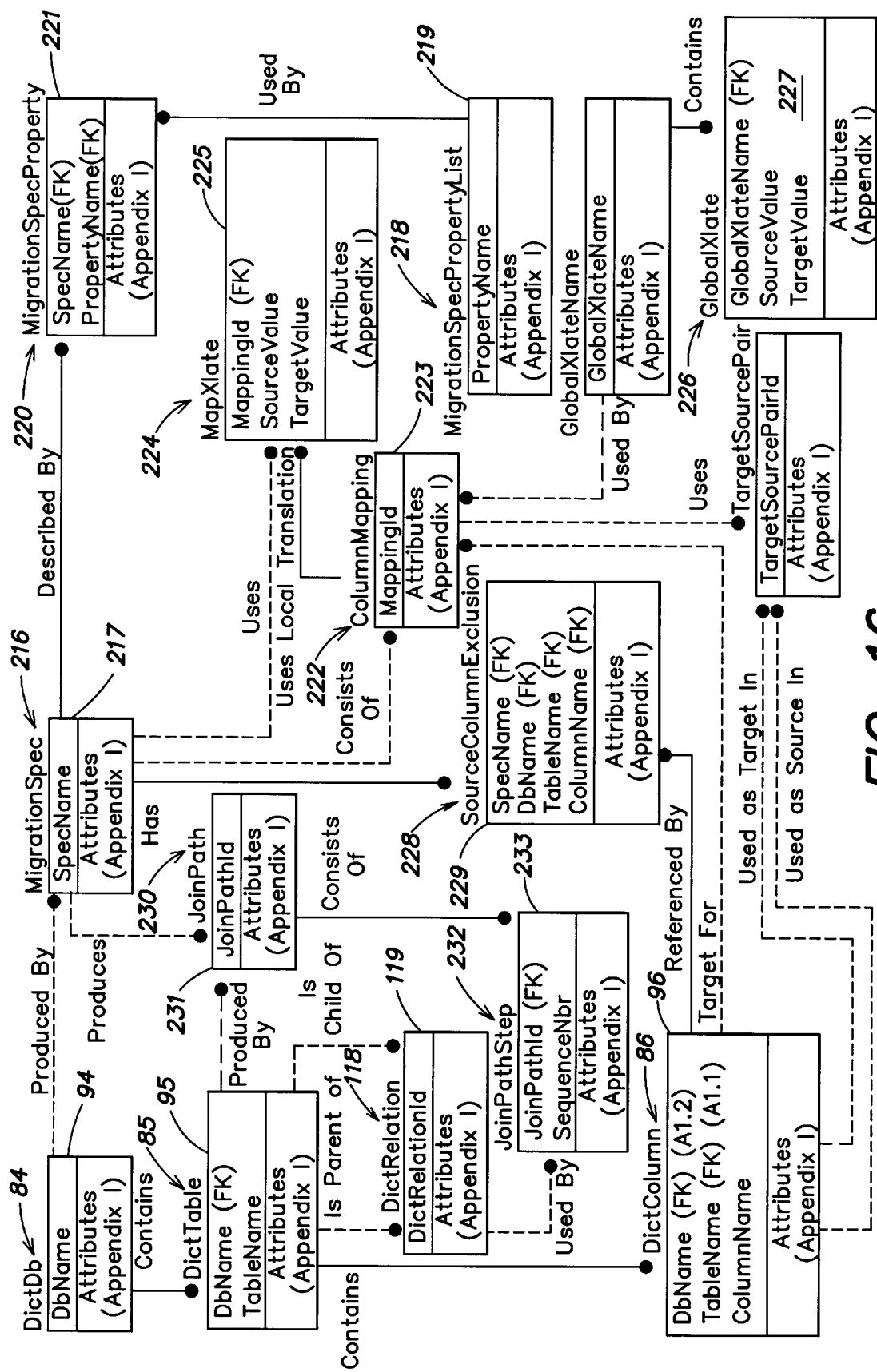
FIG. 16, is another entity relationship diagram used in a description of the functional relationships between entities of the data repository in generating a migration specification which is used in connection with the code generation capabilities of the present invention, as illustrated in FIG. 13.

FIG. 16, which is a summary entity relationship diagram, illustrates all of the entities and relationships used with the migration specifications. The full list of attributes for each of the FIG. 16 entities can be found in Appendix I under the related entity heading. The MigrationSpec entity 216 (with primary key 217) represents migration specifications. Specifications can include additional customer properties as defined in the MigrationSpecPropertyList entity 218 (with primary key 219) and MigrationSpecProperty entity 220 (with primary keys 221). A migration specification is focused upon the concept of defining the procedures required to produce the data values for a single column.

The process by which every target table column is produced is defined by the ColumnMapping entity 222 (with primary key 223). The transformation expression (TransformExpr- see Appendix I) is an attribute of the ColumnMapping entity 222. The transformation expression can include any number of source column references, along with additional specifications that transform data, including (but not limited to): invocations of functions; simple or complex arithmetic operators; and string manipulation.

Every source column reference is in the format:

"{DatabaseName!TableName!ColumnName}".

The exclamation mark separates each name value, and the curly braces delimit the expression. These special characters are configurable. Examples of transformation expressions include:

(i) a simple reference to a single source column:
{Payroll!Employee!EmployeeNbr};
(ii) the sum of two source columns:
{Payroll!Salary!BaseSalary}+ {Payroll!Salary!Commission};
(iii) the result of a function invocation (substring):
substr({Payroll!Employee!LastName}, 1, 20).

In all cases, the transformation expression defines the manner in which corresponding values of the referenced source columns are processed to produce a single value of the target column.

Production of a target column may also include direct mappings of source column values using mapping tables that are either specific to the migration specification (the MapXlate entity 224, with primary keys 225) or are globally defined for use within more than one migration specification (the GlobalXlate entity 226, with primary keys 227).

The single target column to be produced via an instance of the ColumnMapping entity 222 is linked to the definition of that target column (within the appropriate table of the target database) via a relationship to the corresponding DictColumn entity 86 instance.

Every source column referenced in the transformation expression for a given target column is similarly linked to the definitions of the corresponding source columns (within the appropriate table of the source database) via a relationship to the corresponding DictColumn entity instance.

Not every source column will be referenced in a migration specification that references the source table containing that column. This can occur, for instance, if a source database is being used to produce a data warehouse in which only a portion of the data will be available. If such a source column is to be deliberately excluded, that may be noted by creation of an instance of the SourceColumnExclusion entity 228 (with primary keys 229). This can be used to omit warnings during validation of a migration specification.

Migration specifications are often used to produce target data using a process that must combine data from multiple source tables. In such cases, data from the source tables must be combined in an appropriate manner to yield correct results during the process of building the target data. The existing relationships within the source data must therefore be utilized. Because these relationships are known within the data repository via the DictRelation entity 118, the architecture supports automatic identification of all possible sequences in which all required source tables might be linked, or joined.

Note that source tables may be directly referenced in a migration specification (in the transformation expression), yet additional source tables often must be involved in the sequence of joining tables. This occurs when the referenced source tables are not all directly related to one another, and must be indirectly joined via other source tables.

Each possible sequence of joining source tables is noted as an instance of the JoinPath entity 230 (with primary key 231). The joining of a pair of tables in the path is noted by an ordered instance of the JoinPath entity 230. Each such instance of the JoinPathStep entity 232 (with primary keys 233) instance is related to the single DictRelation instance that supports that table join. The first table in the join path is referred to as the "viewpoint table". The selection of a different viewpoint table often yields a very different result within the target table.

When a migration specification is complete for a target table, the specification can be used as the basis for generating an ETL job. The generated job will be defined using the syntax/protocol of the chosen ETL vendor. Following the relevant processing by the ETLTool, the job can then be run to create the target table as specified.

Figure 17:
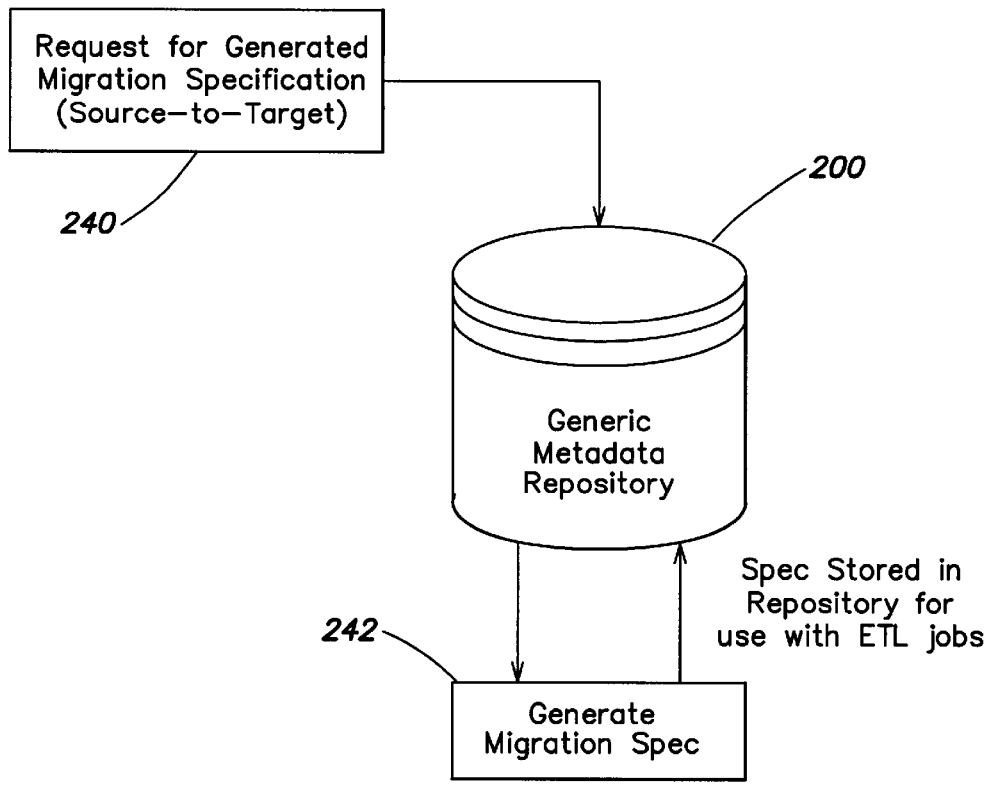
FIG. 17, is a figurative block diagram used in conjunction with the entity relationship diagram of FIG. 16.

The data repository architecture supports the manual entry of migration specifications, since this may continue to be the primary form of creation in the near term. However, as shown in FIG. 17, upon a request 240 by the user, the migration specification 242 may be automatically generated from the data analysis results for the source database, which is stored in the data repository 200.

The analysis results define the source database schema, and this source database definition may be used to automatically generate the target database definition in the repository. As known to those skilled in the art, this would entail using the results of the source database analysis to create the necessary dictionary entities and relationships for the target database. With the target database defined, the user may then elect to automatically generate the migration specification which maps the data migration from the source database into the new target database by defining the transformations of source data required to migrate data from the original source tables into the new target tables. If the process of normalization has also been performed, any resulting changes to the source database schema will be incorporated into both the new target database definition and the migration specification.

When a migration specification is automatically generated during a target database generation, both the new database schema and the migration specification are stored in the repository. The automatically generated results can then be manually adjusted if needed before using them for further generation. The specification will include the transformations as mappings for columns of all the target tables in the new schema. The specification can be used to move the original source data into the new target database schema, by generating an ETL job based on the specification. This completes the preparation for projects in which the source database is being transformed into an analyzed/revised, perhaps normalized, target database. Once the target schema and associated migration specification have been generated, the target database can be created and the source data migrated to it (via the generated ETL job).

The data repository architecture also supports the generation of many types of computing languages and other content in different formats. Often, this generated material is for use by third-party products, via some kind of import or transfer/communication mechanism. Therefore, information may be needed in order to generate the appropriate syntax/format, or to determine the correct import/transfer/communication protocol. This information might be dependent upon the characteristics and capabilities of a third-party product, or upon an applicable independent standard, such as ANSI SQL 92.

Figure 18:
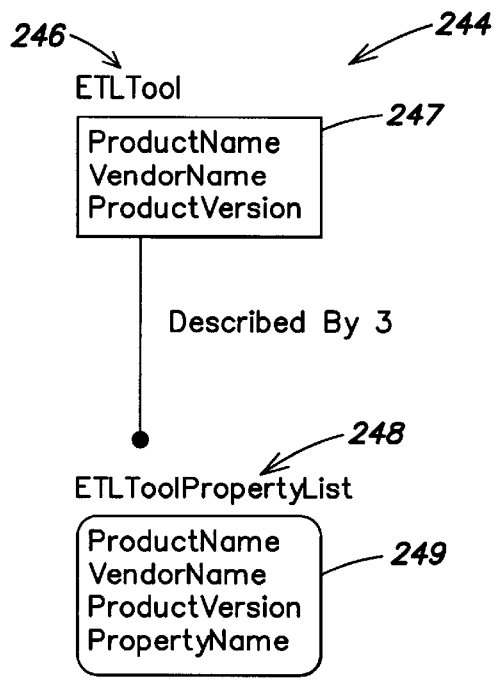
FIG. 18, is another entity relationship diagram illustrating a subject area of the data repository which may be used in connection with code generation for the representative EDM applications identified in FIG. 13.

The repository contains a subject area 244, shown in the summary entity relationship diagram of FIG. 18, in which this type of information may be defined and subsequently used during generation of materials and/or communication with third-party products (many of which are referred to as "ETL"—Extract/Transform/Load—tools). The entities in the ETL Tool subject area 244 include an ETLTool entity 246 (with primary keys 247), and an ETLToolPropertyList entity 248 (with primary keys 249). The full list of attributes for each of the FIG. 18 entities can be found in Appendix I under the related entity heading.

The ETLTool entity 246 represents a single-supported language, or standard, or third-party product. For example, a supported standard (ANSI SQL 92) might be represented as:

ProductName: ANSI SQL
VendorName: ANSI
ProductVersion: 92

A functional example of a representation of a third-party vendor might be:

ProductName: ZippyDB
VendorName: Databases R Us
ProductVersion: 2.3.1

The ETLToolPropertyList entity 248 is the child entity of the parent ETLTool entity 246, and represents all items of information relevant to the parent entity. There will always be at least one property, having the PropertyName "ToolType", for a given instance of ETLTool. The ToolType property serves as a broad classification of the parent entity. There will usually be additional child instances of ETLToolPropertyList, as required.

Continuing the previous example, the "ANSI SQL 92" instance of ETLTool might be referenced by the following properties defined as:

ETLToolPropertyList instances:
   ToolType: RDBMS
   QuotedIdentifierChar:"
   IdentifierMaxLength: 30
   StmtTerminator:;

These example properties define characteristics of the ANSI SQL 92 standard that can be used at runtime by program code that must understand various aspects of the standard. For example, this might be code that is tasked with generating a database schema in ANSI SQL 92 syntax, and must therefore know the correct character sequence with which to terminate a statement (in this case, a semicolon).

Integration with such a third party tool may take a variety of forms, including but not limited to:
   (i) transfer of metadata between the repository and the ETLTool; or
   (ii) creation of a "job" in a form supported by the ETLTool, which is then made known to the tool through any supported transfer/communication mechanism; or
   (iii) communication to and/or from the ETLTool using a supported communication protocol/architecture.

Any such integration activity may require that certain information about the third-party product be known. For example, consider a product that can receive communication (a packet of information) via a connection through a transmission control protocol (TCP) socket on some known TCP port number. In this case, the port number that is configured to receive such a connection/transmission would likely be documented in the repository by using an ETLToolPropertyList instance to specify the port number.

As another example, consider a third-party product that would automatically process a generated file containing an ETL job definition, if that file was placed in a specific directory on a certain computer. In this case, both the computer name/address and the location (pathname) of the directory would likely be defined for that product using two instances of the ETLToolPropertyList entity. As recited above, Appendix I includes a full list of attributes for each of the FIG. 18 entities, under the related entity heading.

As known to those skilled in the art, an ETL job is a procedure, or set of related procedures, whose purpose is to produce data in some desired form. Generally the ETL job retrieves existing data, transforms it in some manner, and uses the results to create a new collection of data. For example, a data migration process is an example of an ETL job.

Figure 19:
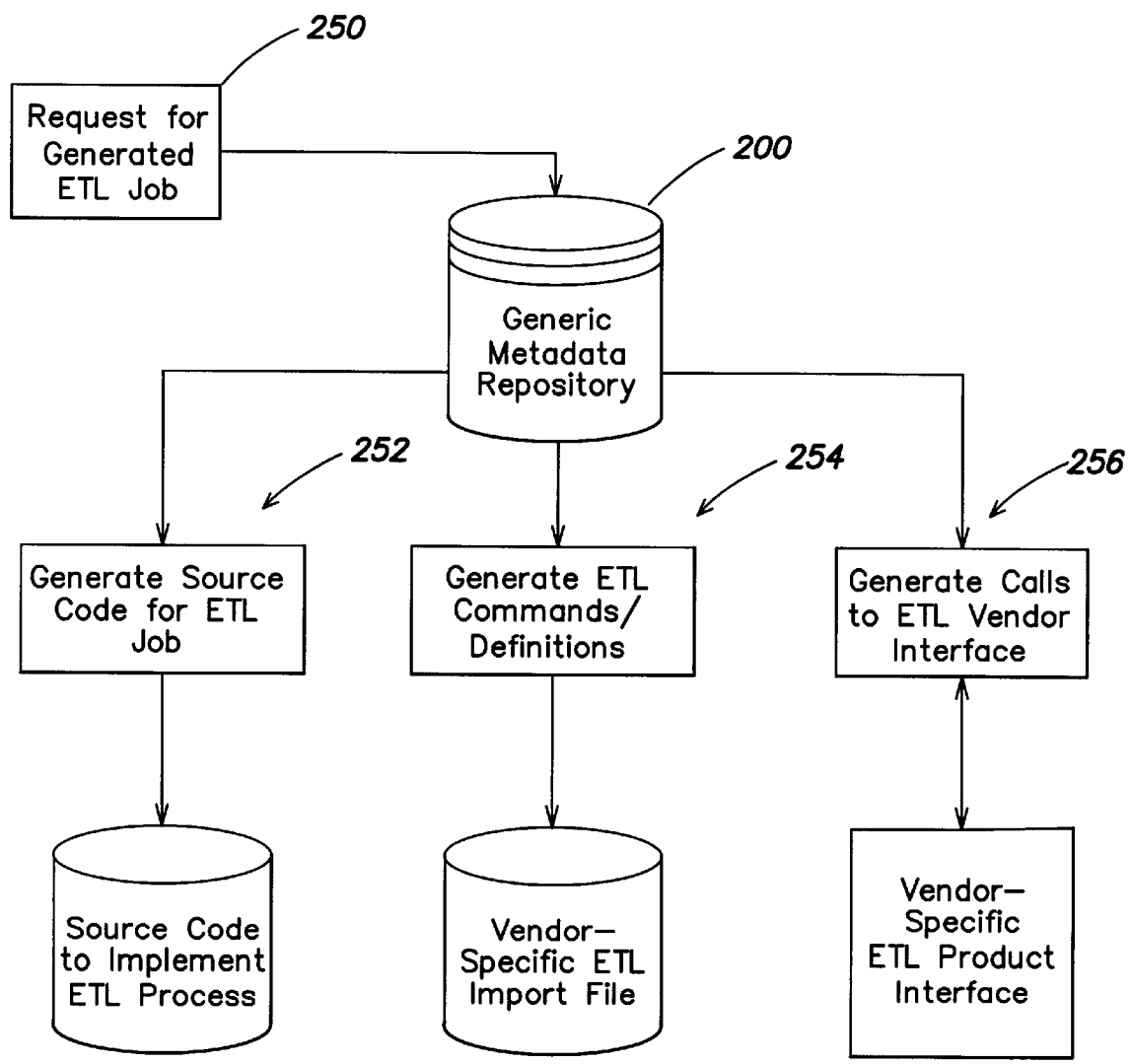
FIG. 19, is a figurative block diagram used in the description of the present invention in connection with providing software code generation for the representative EDM applications of FIG. 13.

According to the present invention, ETL jobs can be automatically generated from the information in the repository, because they are based on migration specifications. Once a migration specification is completely defined, it can be used to automatically generate an ETL job in the appropriate format for any supported ETLTool. Referring to FIG. 19, the data repository 200 responds to a user request 250 to generate an ETL job, and it invokes the appropriate generation code to create the desired output, such as the source code for an ETL job 252, the ETL commands and/or definitions 254, and the generation of calls 256 to a known ETL vendor support site, or interface.

The purpose of the ETL job is to create each target table as defined in the migration specification. The content and format of the generated code will be very different for each supported ETLTool, since the ETLTools are proprietary in nature. All aspects of the ETL process will be created solely from the contents of the repository, primarily from the entities related to the migration specification. An OLAP (on-line analytical processing) cube is another example of the variety of EDM applications which may be automatically generated from the complete set of source metadata obtained with the data analysis process and stored in the data repository. As known to those skilled in the art, an OLAP cube is a multi-dimension structure often used for presenting data for enhanced analysis. It generally presents data items as either dimensions or measures.

Figure 20:
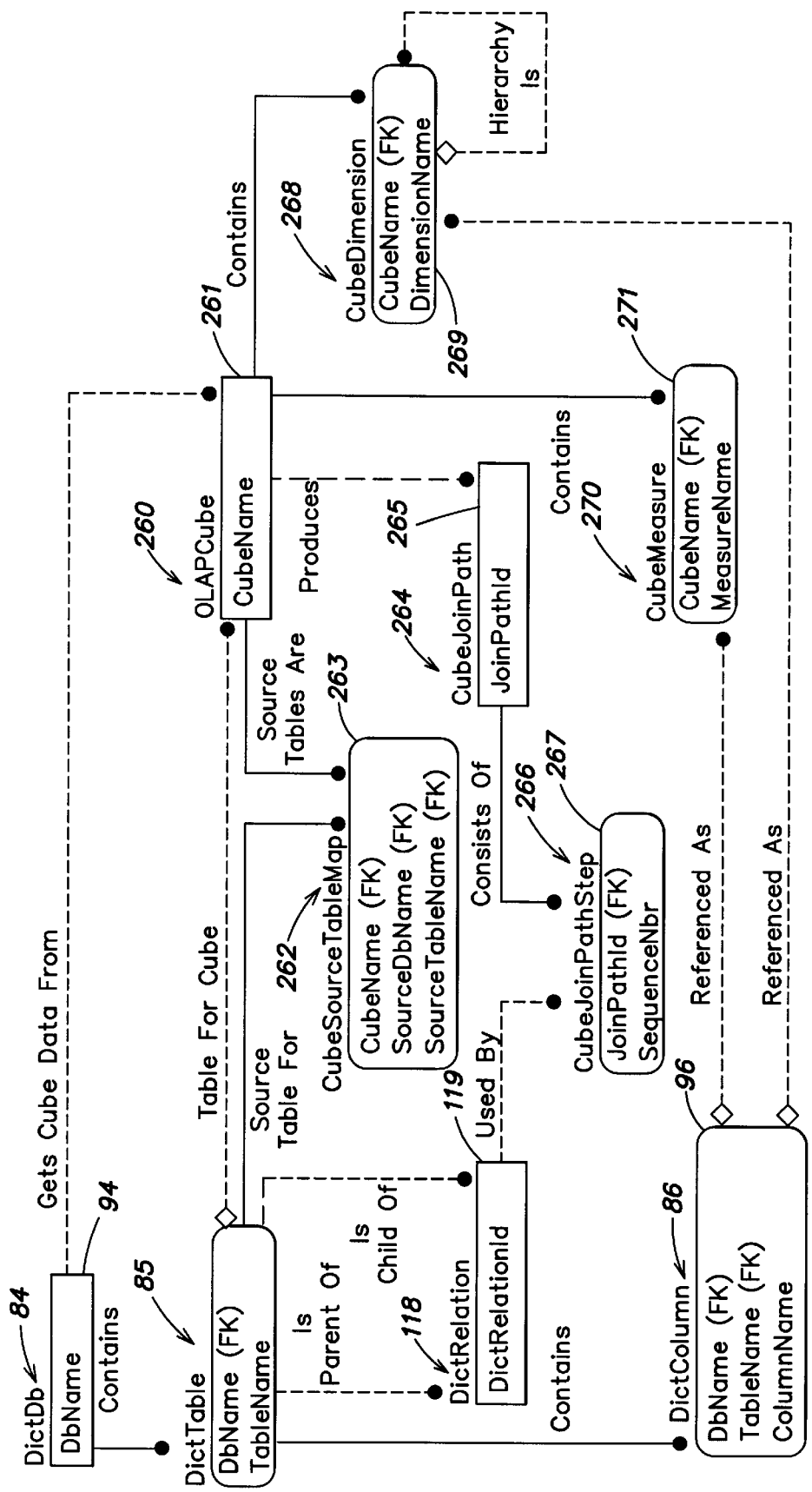
FIG. 20, is another entity relationship diagram used in the description of the functional relationships between the entities of the data repository in the generation of an on-line analytical processing (OLAP) cube, which is another one of the representative EDM applications identified in FIG. 13.

The data repository includes the ability to model OLAP cubes in a generic manner that permits, in conjunction with other repository information, the automatic generation of cube definitions and/or cube construction jobs using a variety of vendor-specific protocols. FIG. 20 is a summary entity relationship diagram illustrating all the entities involved with modeling OLAP cubes, together with their primary keys. The full list of attributes of these entities are listed in Appendix I under the respective entity heading.

Referring to FIG. 20, each unique cube definition is represented by the OLAPCube entity 260 (with primary key 261). The source tables referenced in building the cube are noted by the CubeSourceTableMap entity 262 (with primary keys 263), each occurrence of which is related to the instance of the DictTable entity 85 that defines a referenced source table. As with the JoinPath and JoinPathStep entities (230, 232, FIG. 16) used with migration specifications, the CubeJoinPath entity 264 (with primary keys 265) and the CubeJoinPathStep entity 266 (with primary keys 267) serve to define the possible sequences of source table joins needed to produce the cube data.

Each cube dimension is defined using the CubeDimension entity 268 (with primary keys 267). Each instance of a dimension is related back to the instance of the DictColumn entity 86 from which it is formed. A cube can be defined to include dimension hierarchies, which are modeled using the self-referencing relationship on the CubeDimension entity 268. That is, a named dimension may consist of a group of other named dimensions, any of which in turn may consist of other dimensions.

There is no limit to the number of levels that may be modeled as a dimension hierarchy. Each cube measure is defined using the CubeMeasure entity 270 (with primary keys 271). As with dimensions, each instance of a measure is related back to the DictColumn instance from which it is formed. Once the structure of a cube has been defined, the definition can be used to generate the physical cube. Depending on the capabilities of the chosen OLAP vendor, the cube definition may be transferred directly to the OLAP tool, or processed first by a generated ETL job to prepare the cube data. In any case, the result is an OLAP cube generated automatically from the generic cube definition.

Figure 21:
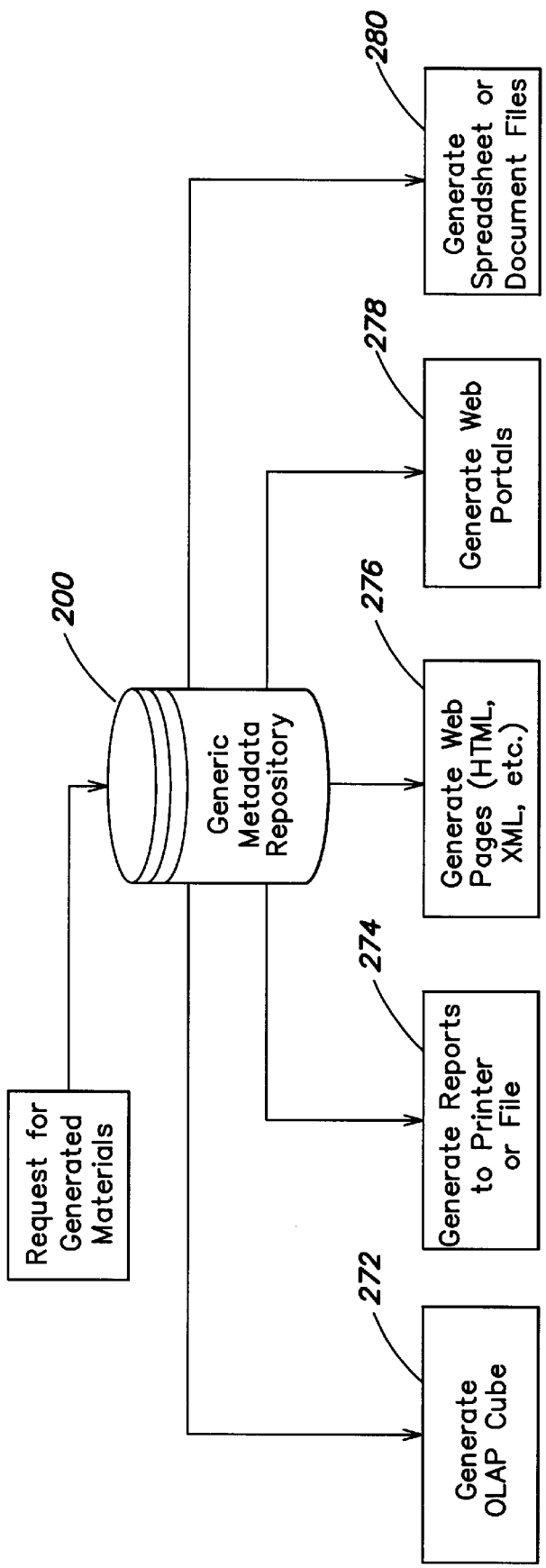
FIG. 21, is a figurative block diagram used in conjunction with the entity relationship diagram of FIG. 29.

FIG. 21 illustrates the generation by the data repository 200 of an OLAP cube 272, together with generation of a variety of other representative presentation materials, including: reports to print or file 274, web pages (e.g., hypertext markup language [HTML], XML) 276, web portals 278, and spreadsheet or document files 280. The generation of an OLAP cube is based on the definition of the cube in the repository. The process required for generation of the other types of presentation materials is dependent on the type of material to be produced, and the interface or medium to be used to make the generated material available.

The generated code for a cube will be dependent on the chosen OLAP vendor, but might take the following forms:

(i) a generated cube specification contained within one or more files using a vendor-specific syntax, which might then be imported or otherwise consumed by the cube software; or (ii) a series of API calls/interactions with a vendor-specific API to define and/or construct the cube; or (iii) the generation of an ETL job to create the cube data in an appropriate format, coupled with the creation of the cube based on that data.

In summary, the variety of data management (DM) applications which may be automatically generated from the metadata repository of the present invention includes, but is not limited to:

(i) materials in a form suitable for presentation, such as web pages, OLAP cubes, or spreadsheets;

(ii) computer software that can be used to produce data and/or presentation materials;

(iii) instructions for external software packages, which are invoked to transform data or produce presentation materials;

(iv) data models, which provide the definition of data sources such as relational databases;

(v) a specification describing how to migrate (transform) data from one or more sources to a target;

(vi) data in a desired target form from one or more sources; and (vii) identifying the similarities among the many types of desired information.

The architecture provided by the present invention provides benefits to the user in terms of increased accuracy, and reduced time and cost to build EDM applications. It also benefits manufacturers in allowing for rapid development of processes that generate new types of materials. Development cost and therefore time-to-market is dramatically reduced.

The metadata-based repository is a key component of the architecture. "Metadata-based" means that the structure of the repository is metadata-centric; that is, the atomic elements of the structure describe the characteristics of the external data that is being modeled. Many areas of information are addressed by the characteristics of the data, including:

(i) the data type characteristics of individual data elements;

(ii) the grouping of elementary data items into a collection, such as a file or table;

(iii) the grouping of collections into an aggregate database;

(iv) the relationships between data elements within collection;

(v) the relationships between collections of data elements; and (vi) the relationships between data elements of different collections.

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

APPENDIX I

DictDbProperty

DbName (FK)
PropertyName (FK)
PropertyValue
CreateDate
CreatorLogin
ModifiedDate
ModifierLogin
DictDbPropertyList PropertyName
Description
DisplayPhrase
PropertyCategory
TypeOfValue
CreateDate
CreatorLogin APPENDIX I-continued ModifiedDate
ModifierLogin
DictTableProperty DbName (FK)
TableName (FK)
PropertyName (FK)
PropertyValue
CreateDate
CreatorLogin
ModifiedDate
ModifierLogin
DictTablePropertyList PropertyName
Description
DisplayPhrase
PropertyCategory
TypeOfValue
CreateDate
CreatorLogin
ModifleDate
ModifierLogin
DictColumnProperty DbName (FK)
TableName (FK)
ColumnName (FK)
PropertyName (FK)
PropertyValue
CreateDate
CreatorLogin
ModifiedDate
ModifierLogin
DictColumnPropertyList PropertyName
Description
DisplayPhrase
PropertyCategory
TypeOfValue
CreateDate
CreatorLogin
ModifiedDate
ModifierLogin
DictDb DbName
DbEnduserName
DbGenName
DbVersion
DbType
DbSubtype
ServerHostname
ServerIpAddress
ServerLoginName
ServerPassword
DbServerName
DbLoginName
DbPassword
DSN
DsnDriver
Directory
DatabaseName
ETLAccessMethod
DbNotes
CreateDate
CreatorLogin
ModifiedDate
ModifierLogin
DictKey DbName (FK)
TableName (FK)
DictKeyNbr
KeyType
DoNotIndexFlag
DictKeyNotes
CreateDate APPENDIX I-continued CreatorLogin
ModifiedDate
ModifierLogin
DictTable DbName (FK)
TableName
TableEnduserName
TableGenName
TableDefPathname
TableType
DbServerName
DbLoginName
DbPassword
DSN
DsnDriver
FileName
Line1ColumnNames
CsvQuoteChar
DelimiterChar
FixedColumnFiller
RecordTerminator
OmitLastNewline
CodeSet
NumericRepresentation
HardwarePlatform
Endian
ETLAccessMethod
DictTableNotes
ApproxRowSize
ApproxRowCount
CreateDate
CreatorLogin
ModifiedDate
ModifierLogin
DictColumn DbName (FK)
TableName (FK)
ColumnName
ColumnSequence
ColumnEnduserName
ColumnGenName
DataType
PrecisionTotal
ScaleRightSide
BytePosition
StorageLength
NullityFlag
IdentityFlag
ExtendedType
DictColumnNotes
CreateDate
CreatorLogin
ModifiedDate
ModifierLogin
DBAnalysis DbName (FK)
DsnUsername
DsnPassword
DistributionDir
SampleDataDir
SampleMethod
SampleParameter
SampleMaxRows
CompositeKeyMaxCols
FunctionalDepThreshold
KeyCoverageThreshold
CommonDomainThreshold
NullityThreshold
ConstantThreshold
UniquenessThreshold
AllDistinctValuesThreshold
DistributionThreshold
TrimLeadSpaces
TrimTrailSpaces
TrimLeadZeros
TrimTrailZeros

APPENDIX I-continued

CaseSensitivity
CaseChange
TreatAsBlobSize
NullStringValue
NullNumericValue
SynonymRequiresTypeMatch
CreateDate
CreatorLogin
ModifierDate
ModifierLogin
DictRelation DictRelationId
ParentDbName (FK)
ParentTableName (FK)
ParentDictKeyNbr (FK)
ChildDbName (FK)
ChildTableName (FK)
ChildDictKeyNbr (FK)
RelationName
ParentMinCardinality
ParentMaxCardinality
ChildMinCardinality
ChildMaxCardinality
DictRelationNotes
CreateDate
CreatorLogin
ModifiedDate
ModifierLogin
TableAnalysis DbName (FK)
TableName (FK)
DistributionDir
ExcludeFromTargetDb
CompositeKeyMaxCols
FunctionalDepThreshold
KeyCoverageThreshold
DistributionThreshold
SampleDataDir
SampleDataFile
SampleMethod
SampleParameter
SampleMaxRows
SampleRowCount
DoNotAnalyzeFlag
DoNotAnalyzeDate
DoNotAnalyzeUser
ColumnAnalysisDate
ColumnAnalysisReviewDate
ColumnAnalysisReviewUser
TableAnalysisDate
TableAnalysisReviewDate
TableAnalysisReviewUser
XTableAnalysisDate
XTableAnalysisReviewDate
XTableAnalysisReviewUser
PKeysDate
PKeysReviewDate
PKeysReviewUser
FKeysDate
FKeysReviewDate
FKeysReviewUser
NormDate
NormReviewDate
NormReviewUser
TotalRowCount
DetColumnCountUsed
CreateDate
CreatorLogin
ModifiedDate
ModifierLogin
ColumnAnalysisConfig DbName (FK)
TableName (FK)
ColumnName (FK)
ColumnAnalysisDate
ColumnAnalysisReviewDate

APPENDIX I-continued

ColumnAnalysisReviewUser
DistributionFileName
DoNotAnalyzeFlag
DoNotAnalyzeDate
DoNotAnalyzeUser
ExcludeFromTargetDb
TrimLeadSpaces
TrimTrailSpaces
TrimLeadZeros
TrimTrailZeros
CaseSensitivity
CaseChange
TreatAsBlobSize
NullNumericValue
NullStringValue
SynonymRequiresTypeMatch
CreateDate
CreatorLogin
ModifiedDate
ModifierLogin
ColumnLeastFrequent ColumnAnalysisId (FK)
DomainValue
CountOfValues
PercentOfValues
DictKeyColumnMap DbName (FK)
TableName (FK)
DictKeyNbr (FK)
ColumnName (FK)
ColumnSequence
CreateDate
CreatorLogin
ModifiedDate
ModifierLogin
ColumnAnalysisResults ColumnAnalysisId
DbName (FK)
TableName (FK)
ColumnName (FK)
DomainChecksum
PreCharSizeMin
PreCharSizeMax
PreCharSizeAvg
CharSizeMin
CharSizeMax
CharSizeAvg
PrecisionTotalMin
PrecisionTotalMax
ScaleRightSideMin
ScaleRightSideMax
MinNumericValue
MaxNumericValue
PreTotalColumnsEmpty
TotalColumnsNull
TotalColumnsEmpty
TotatColumnsActualValues
CardinalityCount
UniquenessIndicator
DataTypeCount
FirstDistributionValue
LastDistributionValue
CreateDate
CreatorLogin
ModifiedDate
ModifierLogin
DateFormat DateFormatId
DateFormat
CreateDate
CreatorLogin
ModifiedDate
ModifierLogin

APPENDIX I-continued

ColumnDataType

ColumnAnalysisId (FK)
DataType
DateFormatId (FK)
CountOfValues
PercentOfValues
ColumnInfoInferred DbName (FK)
TableName (FK)
ColumnName (FK)
DataType
DataTypePercent
DataTypeChosen
PrecisionTotal
PrecisionTotalChosen
ScaleRightSide
ScaleRightSideChosen
ExtendedType
ExtendedTypePercent
ExtendedTypeChosen
NullityFlag
NullValuePercent
NullFlagChosen
ConstantFlag
ConstantPercent
ConstantFlagChosen
UniquenessFlag
UniquenessPercent
UniquenessFlagChosen
AllDistinctValuesFlag
AllDistinctValuesPercent
AllDistinctValuesFlagChosen
CreateDate
CreatorLogin
ModifiedDate
ModifierLogin
ColumnMostFrequent ColumnAnalysisId (FK)
DomainValue
CountOfValues
PercentOfValues
AggregateDependency DependencyId
DbName (FK) (IE1.1)
TableName (FK) (IE1.2)
DeterminateColumnNames
KeyCoveragePercent
ExcludedFlag
ExcludedDate
ExcludedUser
KeyType
DoNotIndexFlag
CreateDate
CreatorLogin
ModifiedDate
ModifierLogin
DeterminantColumn DependencyId (FK)
ColumnName (FK)
DbName (FK)
TableName (FK)
DependentColumn DependencyId (FK)
ColumnName (FK)
DbName (FK)
TableName (FK)
DependencyPercentage
TotalNbrTableRows
DependentNbrTableRows
DomainsCompared DomainsComparedId
DbName (FK)

TableName1 (FK)
ColumnName1 (FK)
TableName2 (FK)
ColumnName2 (FK)
DateCompared
Column1CardinalityCount
Column2CardinalityCount
IntersectionCount
Column1Percentage
Column2Percentage
Column1MatchingValueCount
Column1WeightedPercentage
Column2MatchingValueCount
Column2WeightedPercentage
CreateDate
CreatorLogin
ModifiedDate
ModifierLogin
InferredKey TableNameMapId (FK)
DbName (FK)
TableName (FK)
KeyNbr
DependencyId (FK)
KeyType
DoNotIndexFlag
DictKeyNotes
ExcludedFlag
ExcludedDate
ExcludedUser
CreateDate
CreatorLogin
ModifiedDate
ModifierLogin
TableNameMap TableNameMapId
DbName
TableName
OriginalDbName (FK)
OriginalTableName (FK)
NewDbName (FK)
NewTableName (FK)
CreateDate
CreatorLogin
ModifiedDate
ModifierLogin
CommonDomain DomainsComparedId (FK)
ColumnId
KeyTableNameMapId (FK)
KeyDbName (FK)
KeyTableName (FK)
KeyNbr (FK)
RelationId (FK)
DbName (FK)
BaseTableName (FK)
BaseColumnName (FK)
PairedTableName (FK)
PairedColumnName (FK)
CardinalityCount
IntersectionCount
Percentage
MatchingValueCount
WeightedPercentage
ResolutionType
ExcludedFlag
ExcludedDate
ExcludedUser
CreateDate
CreatorLogin
ModifiedDate
ModifierLogin
InferredKeyColumnMap TableNameMapId (FK)
DbName (FK)

APPENDIX I-continued

TableName (FK)
KeyNbr (FK)
ColumnName
OriginalDbName (FK)
OriginalTableName (FK)
OriginalColumnName (FK)
NewDbName (FK)
NewTableName (FK)
NewColumnName (FK)
ColumnSequence
CreateDate
CreatorLogin
ModifiedDate
ModifierLogin
InferredRelation RelationId
ParentTableNameMapID (FK)
ParentDbName (FK)
ParentTableName (FK)
ChildTableNameMapID (FK)
ChildDbName (FK)
ChildTableName (FK)
ParentKeyTableNameMapId (FK)
ParentKeyDbName (FK)
ParentKeyTableName (FK)
ParentKeyNbr (FK)
ChildKeyTableNameMapId (FK)
ChildKeyDbName (FK)
ChildKeyTableName (FK)
ChildKeyNbr (FK)
RelationName
ParentMinCardinality
ParentMaxCardinality
ChildMinCardinality
ChildMaxCardinality
DictRelationNotes
ExcludedFlag
ExcludedDate
ExcludedUser
CreateDate
CreatorLogin
ModifiedDate
ModifierLogin
OldTableNewTableMap DbName (FK)
NewTableName (FK)
TableName (FK)
CreateDate
CreatorLogin
ModifiedDate
ModifierLogin
NewDbTable DbName (FK)
NewTableName
OldTableName
DependencyId (FK)
DictTableNotes
CreateDate
CreatorLogin
ModifiedDate
ModifierLogin
MigrationSpec SpecName
TargetDbName (FK)
SourceDbName
SpecDescription
Application
Client
CreateDate
CreatorLogin
ModifiedDate
ModifierLogin
JoinPath JoinPathId APPENDIX I-continued SpecName (FK)
TargetDbName (FK)
TargetTableName (FK)
CreateDate
CreatorLogin
ModifiedDate
ModifierLogin
JoinPathStep JoinPathId (FK)
SequenceNbr
DictRelationId (FK)
StartingTableRole
JoinType
CreateDate
CreatorLogin
ModifiedDate
ModifiedLogin
NewDbColumn DbName (FK)
NewTableName (FK)
NewColumnName
OriginalDbName (FK)
OriginalTableName (FK)
OriginalColumnName (FK)
ColumnSequence
ColumnEnduserName
PrimaryKeyFlag
DataType
PrecisionTotal
ScaleRightSide
BytePosition
StorageLength
NullityFlag
IdentityFlag
ExtendedType
DictColumnNotes
CreateDate
CreatorLogin
ModifiedDate
ModifierLogin
SourceColumnExclusion SpecName (FK)
DbName (FK)
TableName (FK)
ColumnName (FK)
CreateDate
CreatorLogin
ModifiedDate
ModifierLogin
TargetSourcePair TargetSourcePairId
MappingId (FK)
TargetDbName (FK)
TargetTableName (FK)
TargetColumnName (FK)
SourceDbName (FK)
SourceTableName (FK)
SourceColumnName (FK)
CreateDate
CreatorLogin
ModifiedDate
ModifierLogin
MigrationSpecProperty SpecName (FK)
PropertyName (FK)
PropertyValue
CreateDate
CreatorLogin
ModifiedDate
ModifierLogin
ColumnMapping MappingId
SpecName (FK)

APPENDIX I-continued

GlobalXlateName (FK)
TargetDb (FK)
TargetTable (FK)
TargetColumn (FK)
TargetInstance
TransformExpr
DefaultifNull
PreProcess
PostProcess
Validation
MappingStatus
MappingNotes
CreateDate
CreatorLogin
ModifiedDate
ModifierLogin
GlobalXlate GlobalXlateName (FK)
SourceValue
TargetValue
Notes
CreateDate
CreatorLogin
ModifiedDate
ModifierLogin
OLAPCube CubeName
SourceDbName (FK)
CubeDbName (FK)
CubeTableName (FK)
View SourceData
OLAPCubeNotes
CubeTablePathname
CreateDate
CreatorLogin
ModifiedDate
ModifierLogin
CubeSourceTableMap CubeName (FK)
SourceDbName (FK)
SourceTableName (FK)
CubeTableType
CreateDate
CreatorLogin
ModifiedDate
ModifierLogin
CubeJoinPath JoinPathId
CubeName (FK)
CreateDate
CreatorLogin
ModifiedDate
ModifierLogin
CubeJoinPathStep JoinPathId (FK)
SequenceNbr
DictRelationId (FK)
StartingTableRole
JoinType
CreateDate
CreatorLogin
ModifiedDate
ModifierLogin
CubeDimension CubeName (FK)
DimensionName
ParentCubeName (FK)
ParentDimensionName (FK)
SequenceNbr
DbName (FK)
TableName (FK)
ColumnName (FK)
CubeDimensionNotes

APPENDIX I-continued

CreateDate
CreatorLogin
ModifiedDate
ModifierLogin
CubeMeasure

CubeName (FK)
MeasureName
SequenceNbr
DbName (FK)
TableName (FK)
ColumnName (FK)
CubeMeasureNotes
CreateDate
CreatorLogin
ModifiedDate
ModifierLogin
ETLTool ProductName
VendorName
ProductVersion
CreateDate
CreatorLogin
ModifiedDate
ModifierLogin
ETLToolPropertyList ProductName (FK)
VendorName (FK)
ProductVersion (FK)
PropertyName
PropertyValue
Description
DisplayPhrase
PropertyCategory
TypeOfValue
CreateDate
CreatorLogin
ModifiedDate
ModifierLogin
MigrationSpecPropertyList PropertyName
Description
DisplayPhrase
PropertyCategory
TypeOfValue
CreateDate
CreatorLogin
ModifiedDate
ModifierLogin
MapXlate MappingId (FK)
SourceValue
TargetValue
SpecName (FK)
Notes
XLateStatus
CreateDate
CreatorLogin
ModifiedDate
ModifierLogin
GlobalXlateName GlobalXlateName
Description
CreateDate
CreatorLogin
ModifiedDate
ModifierLogin

We claim:

1. A method of providing executable software program code for use in an enterprise data management (EDM) application of the type which presents data from one or more data sources to an EDM application database, for use therein in response to user commands, and in a manner defined by the EDM application, comprising:

establishing a data repository having an entity structure with a plurality of entities which collectively define the metadata characteristics of a generic model data source, and configuring, within said repository, one or more individual constructs of said plurality of entities, each in accordance with the construct of an associated one of the data sources;

analyzing each data source in response to the repository configured entities of their individual constructs to obtain the source metadata for each data source; and defining the executable software program code to present data from each data source in the manner defined by the EDM application, and with a data content determined by the source metadata obtained for each data source.

2. The method of claim 1, wherein said entity structure of said data repository is independent of the construct of the data source.

3. The method of claim 1, wherein said entity structure of said data repository comprises plural entities, each of said plural entities corresponding to a different aspect of a generic model data source, and each having atomic elements corresponding to the metadata attributes of a generic entity, whereby said plural entities collectively define the metadata characteristics of a generic model data source.

4. The method of claim 3, wherein said step of analyzing includes:

obtaining, from the data source, those elements of source data which correspond to the metadata attributes of the configured data repository entities; and recording the obtained elements of source data in said data repository, each in association with their corresponding metadata attribute.

5. The method of claim 4, wherein said step of analyzing further includes:

inferring selected aspects of the data source structure on the basis of said recorded elements of source data, and recording the inferred data source aspects in said data repository;

presenting said inferred data source aspects for review by an operator; and modifying said inferred data source aspects in response to command of the operator.

6. The method of claim 4, wherein said data repository entities include at least one each of a database entity, a table entity, and a column entity, each thereof having plural metadata attributes, and each thereof having an associated child property entity, each said child property entity being capable of receiving therein additional metadata attributes to be associated with its parent entity, as provided by an operator, thereby permitting modification of the parent entity attributes without altering said data repository entity structure.

7. The method of claim 6, wherein:

said step of obtaining includes retrieving, as available from the data source, those elements of source data corresponding to the attributes of each of said database entity, said table entity, and said column entity.

8. The method of claim 7, wherein said step of obtaining further includes:

recording, in a first area of said data repository, those elements of source data received in said step of retrieving, and inferring therefrom the data source schema.

9. The method of claim 3 wherein:

said data repository entities include at least one each of a database analysis entity, a table analysis entity, and a column analysis entity; and wherein said step of analyzing includes, acquiring, by elemental examination of the data source schema, those elements of source data corresponding to the metadata attributes of one or all of said database analysis entity, said table analysis entity, and said column analysis entity;

recording, in said data repository, those elements of source data received in said step of acquiring, and inferring therefrom the data source schema.

10. The method of claim 9, wherein said defining comprises:

creating, within said repository, a migration specification utility comprising a plurality of mapping expressions, each of said mapping expressions defining the functional relationships between the attributes of a generic data source and those of a generic EDM application database;

entering into the migration specification utility the attributes of each data source as determined by its associated source metadata, and the attributes of the user defined EDM application database, to define an EDM application transformation expression which identifies the steps necessary to present data from each data source to the EDM application database; and generating the executable software program code for the EDM application in accordance with the EDM application transformation expression.

11. The method of claim 10, wherein said generating includes:

using an extract, transform, and load (ETL) utility to generate the executable software program code directly from said EDM application transformation expression.

12. The method of claim 11, wherein:

said plurality of entities of said data repository further include entities which define the metadata characteristic of a generic ETL utility.

13. The method 12, wherein generating includes:

providing the EDM application transformation expression in the protocol of the ETL utility.

14. Apparatus for providing executable software program code for use in an enterprise data management (EDM) application of the type which presents data from one or more data sources to an EDM application database, for use therein in response to user commands, and in a manner defined by the EDM application, comprising:

a graphical user interface (GUI), responsive to commands entered by a user; and an analysis signal processor, responsive to said GUI, and adapted for connectivity to each data source, said analysis signal processor having a memory medium for storing signals, including program signals; said analysis signal processor, in response to said program signals:

creating, within said memory medium, a data repository having an entity structure with a plurality of entities which collectively define the metadata characteristics of a generic model data source, and configuring, within the repository, one or more individual constructs of the entities, each in accordance with the construct of an associated one of the data sources;

analyzing each data source in response to the repository configured entities of their individual constructs to obtain the source metadata for each data source; and defining the executable software program code to present data from each data source in the manner defined by the EDM application, and with a data content determined by the source metadata obtained for each data source.

15. The apparatus of claim 14, wherein said entity structure of said data repository is independent of the construct of the data source.

16. The apparatus of claim 14, wherein said entity structure of said data repository comprises plural entities, each of said plural entities corresponding to a different aspect of a generic model data source, and each having atomic elements corresponding to the metadata attributes of a generic entity, whereby said plural entities collectively define the metadata characteristics of a generic model data source.

17. The apparatus of claim 16, wherein said step of analyzing includes:

obtaining, from the data source, those elements of source data which correspond to the metadata attributes of the configured data repository entities; and recording the obtained elements of source data in said data repository, each in association with their corresponding metadata attribute.

18. The apparatus of claim 17, wherein said data repository entities include at least one each of a database entity, a table entity, and a column entity, each thereof having plural metadata attributes, and each thereof having an associated child property entity, each said child property entity being capable of receiving therein additional metadata attributes to be associated with its parent entity, as provided by an operator, thereby permitting modification of the parent entity attributes without altering said data repository entity structure.

19. The apparatus of claim 18, wherein said defining comprises:

creating, within said repository, a migration specification utility comprising a plurality of mapping expressions, each of said mapping expressions defining the functional relationships between the attributes of a generic data source and those of a generic EDM application database;

entering into the migration specification utility the attributes of each data source as determined by its associated source metadata, and the attributes of the user defined EDM application database, to define an EDM application transformation expression which identifies the steps necessary to present data from each data source to the EDM application database; and generating the executable software program code for the EDM application in accordance with the EDM application transformation expression.

20. The apparatus of claim 19, wherein said generating includes:

using an extract, transform, and load (ETL) utility to generate the executable software program code directly from said EDM application transformation expression.

21. The apparatus of claim 20, wherein:

said plurality of entities of said data repository further include entities which define the metadata characteristic of a generic ETL utility.

22. The apparatus of claim 20, wherein said generating includes:

providing the EDM application transformation expression in the protocol of the ETL utility.

* * * * *